United States Patent
Chou

(10) Patent No.: US 11,327,787 B2
(45) Date of Patent: May 10, 2022

(54) USING A MANAGED OBJECT OPERATION TO CONTROL A LIFECYCLE MANAGEMENT OPERATION

(71) Applicant: Apple Inc., Cupertino, CA (US)

(72) Inventor: Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 215 days.

(21) Appl. No.: 16/319,886

(22) PCT Filed: Feb. 8, 2017

(86) PCT No.: PCT/US2017/016961
§ 371 (c)(1),
(2) Date: Jan. 23, 2019

(87) PCT Pub. No.: WO2018/034693
PCT Pub. Date: Feb. 22, 2018

(65) Prior Publication Data
US 2019/0266012 A1   Aug. 29, 2019

Related U.S. Application Data

(60) Provisional application No. 62/376,126, filed on Aug. 17, 2016.

(51) Int. Cl.
  *G06F 9/46*  (2006.01)
  *G06F 9/48*  (2006.01)
  (Continued)

(52) U.S. Cl.
  CPC .............. *G06F 9/485* (2013.01); *G06F 9/455* (2013.01); *G06F 9/5077* (2013.01); *H04L 41/0806* (2013.01)

(58) Field of Classification Search
  CPC ....................................................... G06F 9/485
  (Continued)

(56) References Cited

U.S. PATENT DOCUMENTS 10,540,190 B2 * 1/2020 Burli .................. G06F 8/36
10,742,502 B2 * 8/2020 Ni ...................... H04L 41/082
(Continued)

FOREIGN PATENT DOCUMENTS

WO    2016/048430 A1    3/2016

OTHER PUBLICATIONS

3rd Generation Partnership Project "3GPP TS 28.511 v0.3.0 (May 2016)", 9 pages, [online][retrieved on Aug. 25, 2020], Retrieved from <https://itectec.com/archive/3gpp-specification-ts-28-511/>.*
(Continued)

*Primary Examiner* — Evral E Bodden
(74) *Attorney, Agent, or Firm* — Eschweiler & Potashnik, LLC

(57) ABSTRACT

Techniques for linking managed object (MO) operations and lifecycle operations associated with VNFs (Virtual Network Functions) are discussed. In various actions, MO operations can trigger associated lifecycle operations, or lifecycle operations can trigger associated MO operations. In some aspects, MO instance creation by an EM (Element Manager) can trigger associated VNF instantiation by a VNFM (VNF Manager), or vice versa. In the same or other aspects, MO instance deletion by an EM can trigger termination of an associated VNF by a VNFM, or vice versa.

18 Claims, 13 Drawing Sheets

(51) Int. Cl.
*G06F 9/455* (2018.01)
*G06F 9/50* (2006.01)
*H04L 41/0806* (2022.01)

(58) Field of Classification Search
USPC .................................................. 718/100
See application file for complete search history.

(56) References Cited

U.S. PATENT DOCUMENTS

| | | | | |
|---|---|---|---|---|
| 2016/0050119 A1* | 2/2016 | Chhabra | ............... | H04L 47/724 370/218 |
| 2016/0105488 A1* | 4/2016 | Thakkar | ................. | H04L 67/34 709/217 |
| 2019/0363924 A1* | 11/2019 | Tse | ..................... | H04L 41/0233 |
| 2020/0133708 A1* | 4/2020 | Li | ..................... | H04L 41/0893 |

OTHER PUBLICATIONS

3rd Generation Partnership Project "3GPP TR 32.842 VI 3.1.0 (Dec. 2015)", 84 pages, [online][retrieved on Aug. 25, 2020], Retrieved from <ttp://www.arib.or.jp/english/html/overview/doc/STD-T63V12_00/5_Appendix/Rel13/22/22094-d00.pdf>.*

International Search Report and Written Opinion dated May 19, 2017 for International Patent Application PCT/US2017/016961.

"3rd Generation Partnership Project; Technical Specification Group Services and System Aspects; Telecommunication Management; Configuration Management (CM) for mobile networks that include virtualized network functions; Procedures (Release 14)." 3GPP TS 28.511 V0.5.0 (Nov. 2016). 3GPP, Lte Advanced Pro. 12 pages.

"3rd Generation Partnership Project; Technical Specification Group Services and System Aspects; Telecommunication management; Life Cycle Management (LCM) for mobile networks that include virtualized network functions; Procedures (Release 14)." 3GPP TS 28.526 V0.3.0 (Nov. 2016). 3GPP, Lte Advanced Pro. 18 pages.

"3rd Generation Partnership Project; Technical Specification Group Services and System Aspects; Telecommunication management; Generic Network Resource Model (NRM) Integration Reference Point (IRP); Information Services (IS) (Release 13)." 3GPP TS 28.622 V13.1.0 (Dec. 2016). 3GPP, Lte. Advanced Pro. 22 pages.

"3rd Generation Partnership Project; Technical Specification Group Services and System Aspects; Telecommunication management; Evolved Packet Core (EPC) Network Resource Model (NRM) Integration Reference Point (IRP); Information Service (IS) (Release 13)." 3GPP TS 28.708 V13.0.0 (Jan. 2016). 3GPP, Lte Advanced Pro. 23 pages.

"3rd Generation Partnership Project; Technical Specification Group Services and System Aspects; Telecommunication management; Configuration Management (CM); Basic CM Integration Reference Point (IRP); Information Service (IS) (Release 13)." 3GPP TS 32.602 V13.0.0 (Jan. 2016). 3GPP, Lte Advanced Pro. 27 pages.

"Network Functions Virtualisation (NFV); Management and Orchestration; Ve-Vnfm reference point—Interface and Information Model Specification." ETSI GS NFV-IFA 008 V2.1.1 (Oct. 2016). 83 pages.

* cited by examiner

USING A MANAGED OBJECT OPERATION TO CONTROL A LIFECYCLE MANAGEMENT OPERATION

REFERENCE TO RELATED APPLICATIONS

This application is a National Phase entry application of International Patent Application No. PCT/US2017/016961 filed Feb. 8, 2017, which claims priority to U.S. Provisional Application 62/376,126 filed on Aug. 17, 2016, entitled "METHODS AND SYSTEMS OF USING MANAGED OBJECT OPERATION TO CONTROL LIFECYCLE MANAGEMENT OPERATION" in the name of Joey Chou and is hereby incorporated by reference in its entirety.

FIELD

The present disclosure relates to core network technology of a communication network, and more specifically to techniques for employing managed object operation(s) to control lifecycle management operation(s).

BACKGROUND

Network Function Virtualization (NFV) involves the replacement of physical network nodes with Virtual Network Functions (VNFs) implemented via Virtualization Resources (VRs) that perform the same function as the physical node.

DETAILED DESCRIPTION

Figure 1:
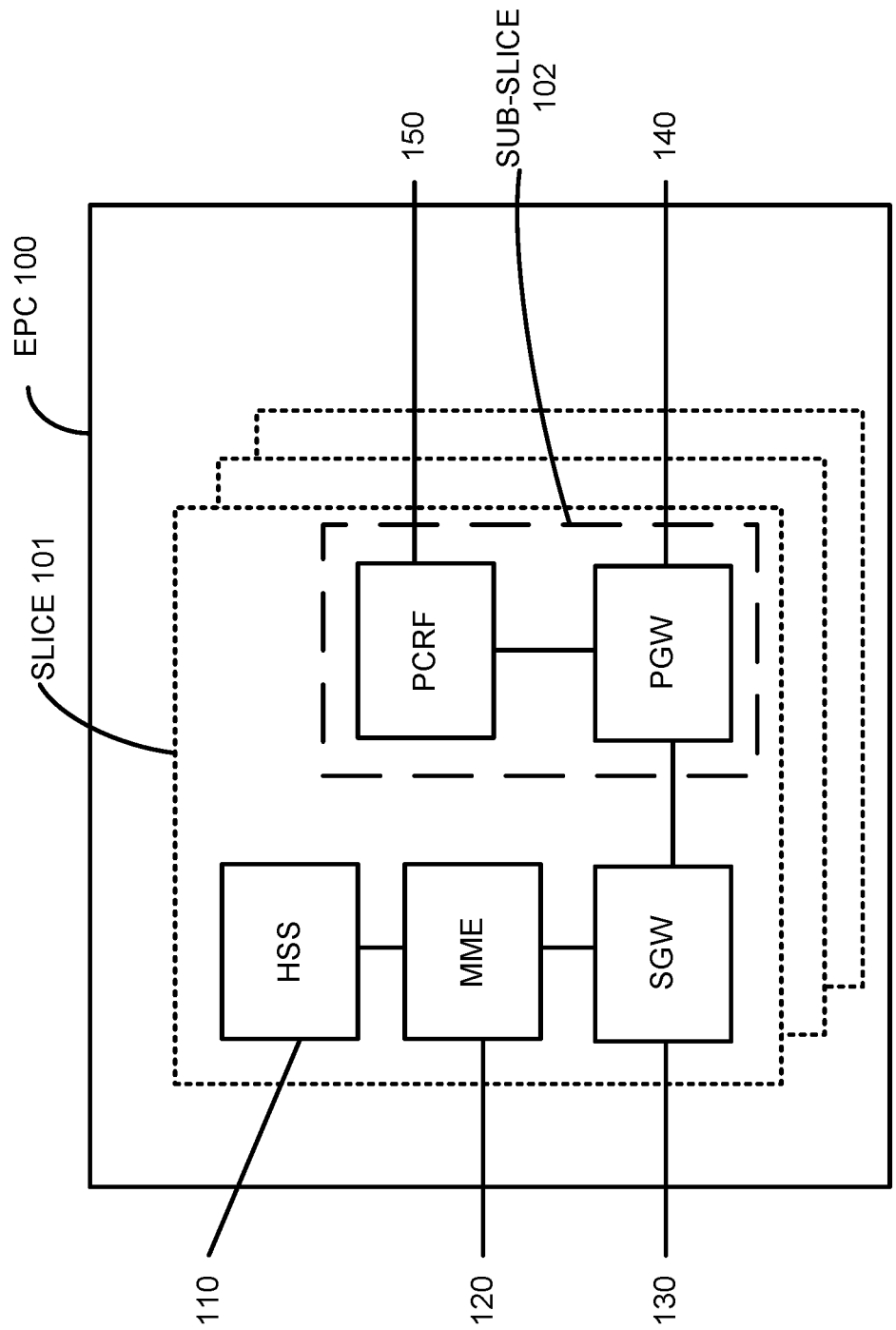
FIG. 1 is a diagram illustrating components of a network in accordance with some embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet personal computer (PC) and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates components of a network in accordance with some embodiments. In various aspects, part(s) or all of one or more of the components illustrated in connection with FIG. 1 can be implemented as virtual network functions (VNFs) in connection with various aspects described herein. An Evolved Packet Core (EPC) network 100 is shown to include a Home Subscriber Server (HSS) 110, a Mobility Management Entity (MME) 120, a Serving GateWay (SGW) 130, a Packet Data Network (PDN) GateWay (PGW) 140, a Policy and Charging Rules Function (PCRF) 150.

The HSS 110 comprises one or more databases for network users, including subscription-related information to support the network entities' handling of communication sessions. For example, the HSS 110 may provide support for routing/roaming, authentication, authorization, naming/addressing resolution, location dependencies, etc. The EPC network 100 may comprise one or several HSSs 110, depending on the number of mobile subscribers, on the capacity of the equipment, on the organization of the network, etc.

The MME 120 is similar in function to the control plane of legacy Serving General packet radio service (GPRS) Support Nodes (SGSN). The MMEs 120 manage mobility aspects in access such as gateway selection and tracking area list management. The EPC network 100 may comprise one or several MMEs 120.

The SGW 130 terminates the interface toward an Evolved UMTS (Universal Mobile Telecommunications System) Terrestrial Radio Access Network (E-UTRAN), and routes data packets between the E-UTRAN and the EPC network 100. In addition, the SGW 130 may be a local mobility anchor point for inter-eNodeB handovers and also may provide an anchor for inter-3GPP mobility. Other responsibilities may include lawful intercept, charging, and some policy enforcement.

The PGW 140 terminates an SGi interface toward the PDN. The PGW 140 routes data packets between the EPC network 100 and external networks, and may be a node for policy enforcement and charging data collection. The PCRF 150 is the policy and charging control element of the EPC network 100. In a non-roaming scenario, there may be a single PCRF in the Home Public Land Mobile Network (Home PLMN or HPLMN) associated with a User Equipment's (UE) Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 150 may be communicatively coupled to an application server (alternatively referred to as application function (AF)). Generally, the application server is an element offering applications that use Internet Protocol (IP) bearer resources with the core network (e.g., UMTS Packet Services (PS) domain, Long Term Evolution (LTE) PS data services, etc.). The application server may signal the PCRF 150 to indicate a new service flow and selecting the appropriate Quality of Service (QoS) and charging parameters. The PCRF 150 may provision this rule into a Policy and Charging Enforcement Function (PCEF) (not shown) with the appropriate traffic flow template (TFT) and QoS class of identifier (QCI), which commences the QoS and charging as specified by the application server.

The components of the EPC 100 may be implemented in one physical node or separate physical nodes. In some embodiments, Network Functions Virtualization (NFV) is utilized to virtualize any or all of the above described network node functions via executable instructions stored in one or more computer readable storage mediums (described in further detail below). A logical instantiation of the EPC network 100 may be referred to as a network slice 101. A logical instantiation of a portion of the EPC network 100 may be referred to as a network sub-slice 102 (e.g., the network sub-slice 102 is shown to include the PGW 140 and the PCRF 150).

Figure 2:
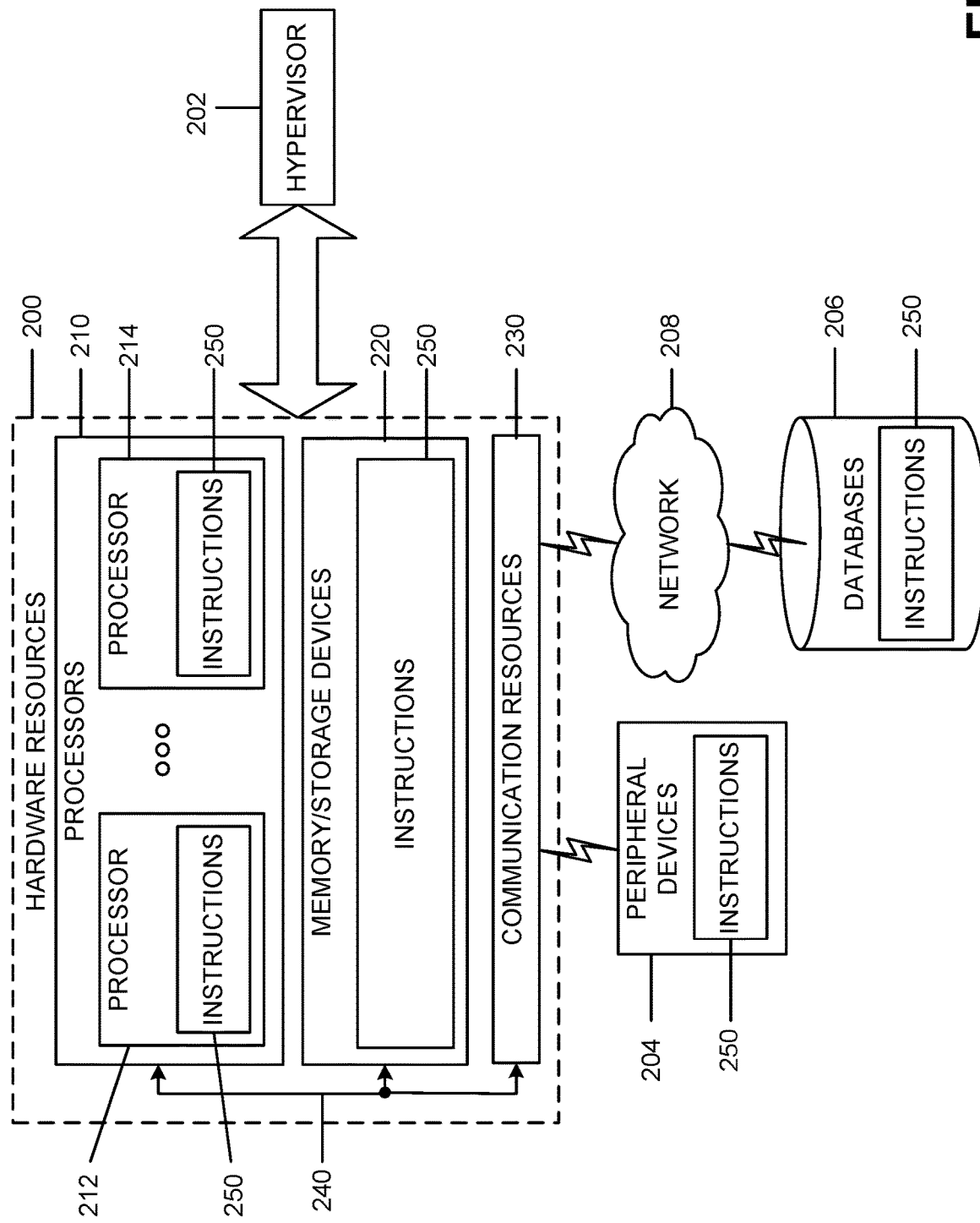
FIG. 2 is a block diagram illustrating components, according to some example embodiments, able to read instructions from a machine-readable or computer-readable medium (e.g., a machine-readable storage medium) and perform any one or more of the methodologies discussed herein.

FIG. 2 is a block diagram illustrating components, according to some example embodiments, able to read instructions from a machine-readable or computer-readable medium (e.g., a machine-readable storage medium) and perform any one or more of the methodologies discussed herein. Specifically, FIG. 2 shows a diagrammatic representation of hardware resources 200 including one or more processors (or processor cores) 210, one or more memory/storage devices 220, and one or more communication resources 230, each of which are communicatively coupled via a bus 240. For embodiments where node virtualization (e.g., NFV) is utilized, a hypervisor 202 may be executed to provide an execution environment for one or more network slices/sub-slices to utilize the hardware resources 200.

The processors 210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 212 and a processor 214. The memory/storage devices 220 may include main memory, disk storage, or any suitable combination thereof.

The communication resources 230 may include interconnection and/or network interface components or other suitable devices to communicate with one or more peripheral devices 204 and/or one or more databases 206 via a network 208. For example, the communication resources 230 may include wired communication components (e.g., for coupling via a Universal Serial Bus (USB)), cellular communication components, Near Field Communication (NFC)

components, Bluetooth® components (e.g., Bluetooth® Low Energy), Wi-Fi® components, and other communication components.

Instructions 250 may comprise software, a program, an application, an applet, an app, or other executable code for causing at least any of the processors 210 to perform any one or more of the methodologies discussed herein. The instructions 250 may reside, completely or partially, within at least one of the processors 210 (e.g., within the processor's cache memory), the memory/storage devices 220, or any suitable combination thereof. Furthermore, any portion of the instructions 250 may be transferred to the hardware resources 200 from any combination of the peripheral devices 204 and/or the databases 206. Accordingly, the memory of processors 210, the memory/storage devices 220, the peripheral devices 204, and the databases 206 are examples of computer-readable and machine-readable media.

Conventionally, when a PLMN network is installed and initialized for the first time, the objects representing all involved NEs are created, and are introduced to the NM, which will enable operators to manage the PLMN networks central to its operations. Since the installation of traditional or non-virtualized PLMN networks is done manually, the managed objects are created manually.

For NFV, managed objects can be created automatically. In virtualized networks, VNF instances are instantiated or terminated automatically according to the VNF lifecycle management procedures; therefore, the associated managed objects are created or deleted automatically.

In various aspects, techniques discussed herein can be employed to link the Managed Object (MO) operations, such as creating a MO (e.g., via a createMO operation) and/or deleting a MO (e.g., via a deleteMO operation), with lifecycle management operations, such as VNF instantiation and/or termination.

Figure 3:
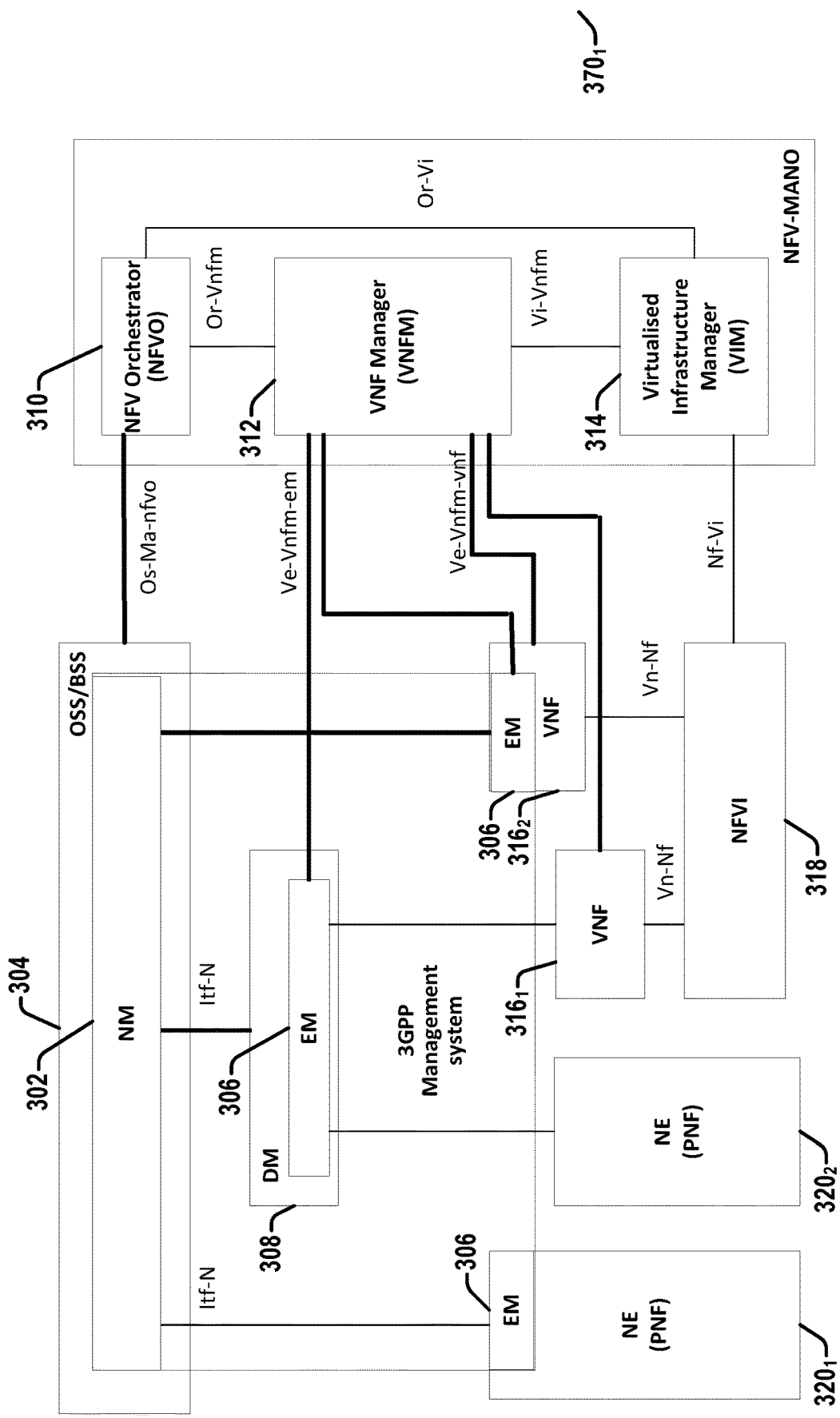
FIG. 3 is a diagram of an example architecture that facilitates support of lifecycle management by a 3GPP (Third Generation Partnership Project) management system, according to various aspects described herein.

Referring to FIG. 3, illustrated is a diagram of an example architecture that facilitates support of lifecycle management by a 3GPP (Third Generation Partnership Project) management system, according to various aspects described herein. The system illustrated in FIG. 3 comprises a Network Manager (NM) 302, Operation Support Systems (OSS)/Business Support Systems 304, network Element Manager (EM) 306, Domain Manager (DM) 308, Network Function Virtualization (NFV) Management and Orchestration (MANO) components (NFV Orchestrator (NFVO) 310, VNF Manager (VNFM) 312, and Virtualized Infrastructure Manager (VIM) 314), a set of Virtualized Network Functions (VNFs) 316; virtualized by Virtualization Resources (VRs) of a NFV Infrastructure (NFVI) 318 (which can comprise a hypervisor such as hypervisor 202 and hardware resources such as hardware resources 200), and optionally one or more Network Entities (NEs) 320i that can implement Physical Network Functions (PNFs). The lines between these entities indicate reference points or other communication connections that can facilitate data exchange between these entities (some of which are labeled, such as reference point Itf-N, etc.).

In various aspects described herein, management object operations (creation and/or deletion) can trigger lifecycle management operations (instantiation and/or deletion), or vice versa.

Figure 4:
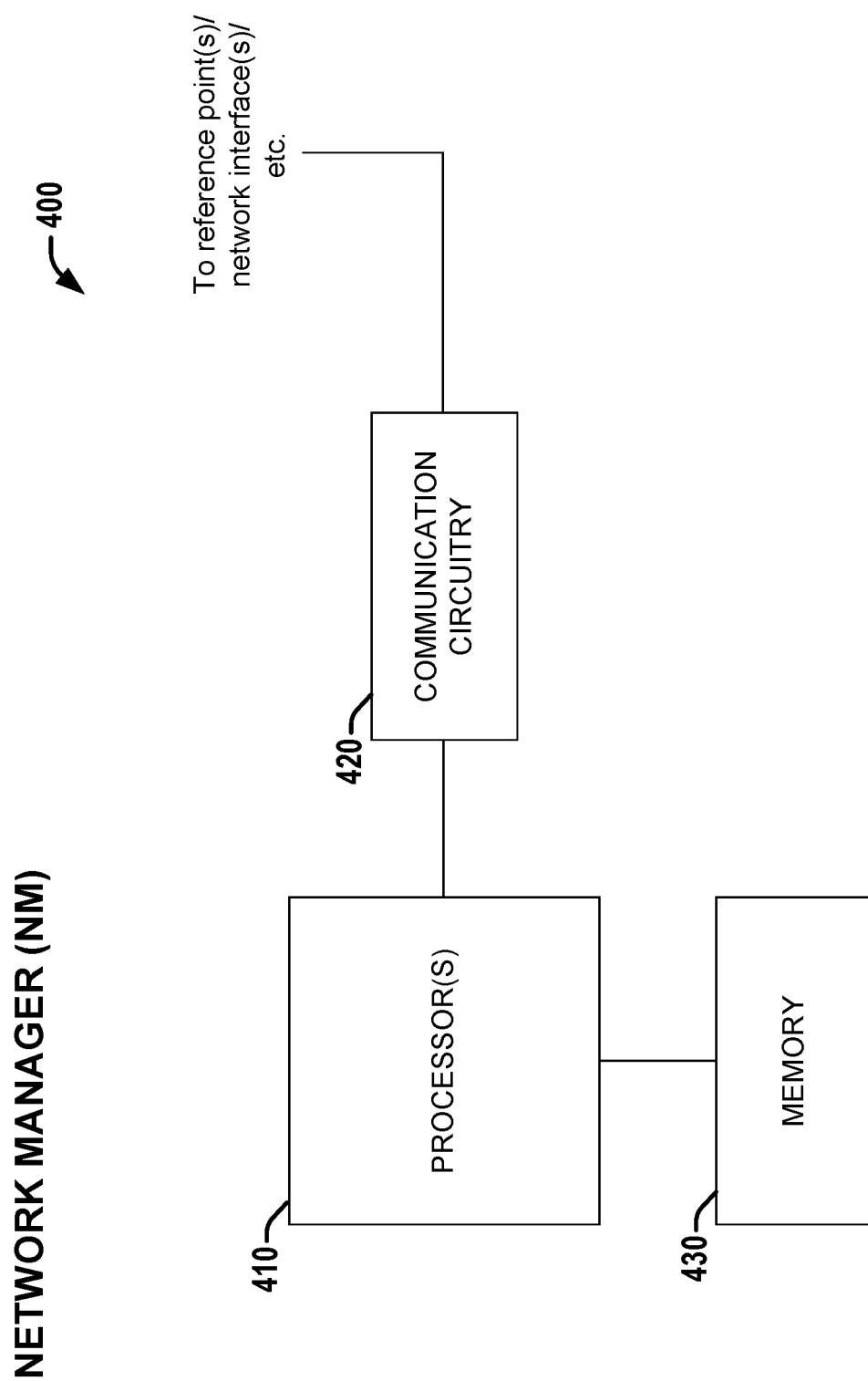
FIG. 4 is a block diagram of a system employable by a Network Manager (NM) that facilitates linking managed object (MO) instance (MOI) operations with lifecycle operations, according to various aspects described herein.

Referring to FIG. 4, illustrated is a block diagram of a system 400 employable by a Network Manager (NM) that facilitates linking managed object (MO) instance (MOI) operations with lifecycle operations, according to various aspects described herein. System 400 can comprise one or more processors 410 (e.g., which can comprise one or more of processor(s) 210, etc.), communication circuitry 420 (which can facilitate communication of data via one or more reference points, networks, etc., and can comprise communication resource(s) 230, etc.), and memory 430 (which can comprise any of a variety of storage mediums and can store instructions and/or data associated with at least one of the one or more processors 410 or communication circuitry 420, and can comprise memory/storage device(s) 220 and/or cache memory of processor(s) 410, etc.). In some aspects, the one or more processors 410, the communication circuitry 420, and the memory 430 can be included in a single device, while in other aspects, they can be included in different devices, such as part of a distributed architecture. As described in greater detail below, system 400 can be employed by a NM to facilitate interactions (such as those described herein) linking MOI operations (e.g., creation, deletion, etc.) with lifecycle operations (e.g., VNF instantiation, VNF termination, etc.), depending on the embodiment.

Figure 5:
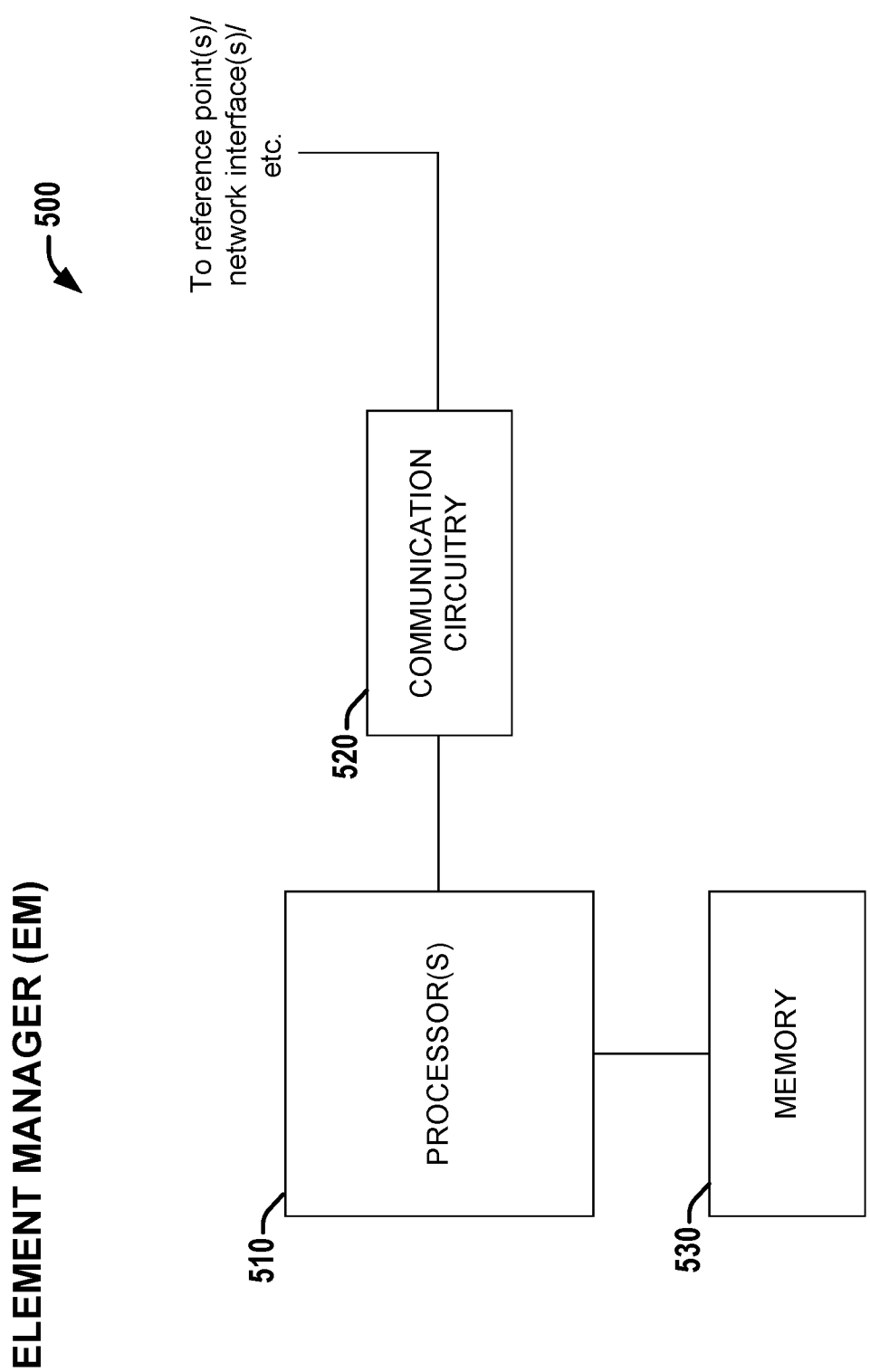
FIG. 5 is a block diagram of a system employable by a network Element Manager (EM) that facilitates linking managed object (MO) instance (MOI) operations with lifecycle operations, according to various aspects described herein.

Referring to FIG. 5, illustrated is a block diagram of a system 500 employable by a network Element Manager (EM) that facilitates linking managed object (MO) instance (MOI) operations with lifecycle operations, according to various aspects described herein. System 500 can comprise one or more processors 510 (e.g., which can comprise one or more of processor(s) 210, etc.), communication circuitry 520 (which can facilitate communication of data via one or more reference points, networks, etc., and can comprise communication resource(s) 230, etc.), and memory 530 (which can comprise any of a variety of storage mediums and can store instructions and/or data associated with at least one of the one or more processors 510 or communication circuitry 520, and can comprise memory/storage device(s) 220 and/or cache memory of processor(s) 510, etc.). In some aspects, the one or more processors 510, the communication circuitry 520, and the memory 530 can be included in a single device, while in other aspects, they can be included in different devices, such as part of a distributed architecture. As described in greater detail below, system 500 can be employed by an EM to facilitate interactions (such as those described herein) linking MOI operations (e.g., creation, deletion, etc.) with lifecycle operations (e.g., VNF instantiation, VNF termination, etc.), depending on the embodiment.

Figure 6:
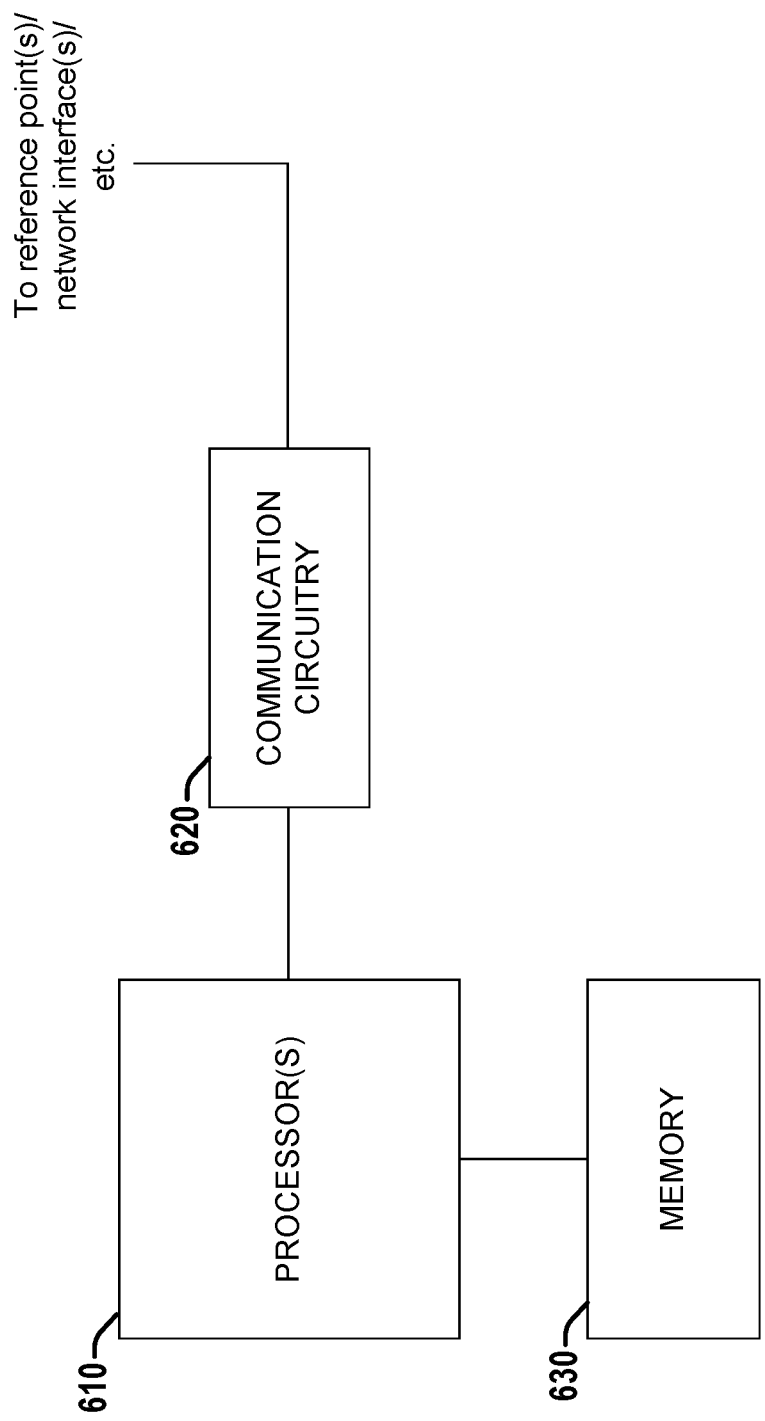
FIG. 6 is a block diagram of a system employable by a Virtual Network Function Manager (VNFM) that facilitates linking managed object (MO) instance (MOI) operations with lifecycle operations, according to various aspects described herein.

Referring to FIG. 6, illustrated is a block diagram of a system 600 employable by a Virtual Network Function Manager (VNFM) that facilitates linking managed object (MO) instance (MOI) operations with lifecycle operations, according to various aspects described herein. System 600 can comprise one or more processors 610 (e.g., which can comprise one or more of processor(s) 210, etc.), communication circuitry 620 (which can facilitate communication of data via one or more reference points, networks, etc., and can comprise communication resource(s) 230, etc.), and memory 630 (which can comprise any of a variety of storage mediums and can store instructions and/or data associated with at least one of the one or more processors 610 or communication circuitry 620, and can comprise memory/storage device(s) 220 and/or cache memory of processor(s) 610, etc.). In some aspects, the one or more processors 610, the communication circuitry 620, and the memory 630 can be included in a single device, while in other aspects, they can be included in different devices, such as part of a distributed architecture. As described in greater detail below, system 600 can be employed by a VNFM to facilitate interactions (such as those described herein) linking MOI operations (e.g., creation, deletion, etc.) with lifecycle operations (e.g., VNF instantiation, VNF termination, etc.), depending on the embodiment.

MOI (Managed Object Instance) Deletion Related Use Cases

The MO instance and VNF instance can exist independently. The following scenarios are potential scenarios that can show the relationship between MO deletion and VNF termination, assuming a MO has been created to represent a VNF instance, and the VNF instance identifier has been stored in the MO during the VNF instantiation.

In a first scenario, the NM can initiate a newer version of a deleteMO operation over the Itf-N reference point that can have a parameter indicating whether the VNF is to be terminated during the process of MO deletion. If the VNF is to be terminated, then the EM can trigger the VNF termination; otherwise, the VNF instance can be standalone, without associating with any MO.

In a second scenario, the NM can initiate a deleteMO operation over Itf-N. The MO can have an attribute that has been previously configured to indicate whether the VNF is to be terminated during the process of MO deletion. If the VNF is to be terminated, then the EM can trigger the VNF termination; otherwise, the VNF instance can be standalone, without associating with any MO.

In a third scenario, the NM can initiate a setMOAttribute operation (which can be an operation to request modification of management information (e.g., MO attribute values) of one or several MOs) over Itf-N to set a new attribute in the MO to indicate whether the EM is to terminate the VNF instance, or to decouple the MO from the VNF instance. In the former case, EM will trigger the VNF termination. In the latter case, both the MO and the VNF instance do not have any relationship.

In a fourth scenario, the NM can initiate the VNF termination operation via the Os-Ma-nfvo reference point. The VNFM can send a notification to EM to indicate the VNF has been terminated. The EM can identify the MO for such VNF instance, based on the VNF instance identifier stored in the MO. The MO can have an attribute that has been previously configured to indicate whether the MO is to be deleted upon VNF termination. If the MO is to be deleted, the EM can delete the MO, and can notify NM that the MO has been deleted. If the MO is not to be deleted, the EM can modify the MO to remove its association with any VNF instance, and can notify the NM about the MO attribute change.

In various aspects discussed herein, MOI (MO Instance) creation and VNF instantiation can be related in one of two ways: (1) MOI(s) creation can trigger VNF instantiation or (2) VNF instantiation can trigger MOI(s) creation.

MOI(s) Creation and VNF Instantiation

MOI(s) Creation to Trigger VNF Instantiation

Figure 7:
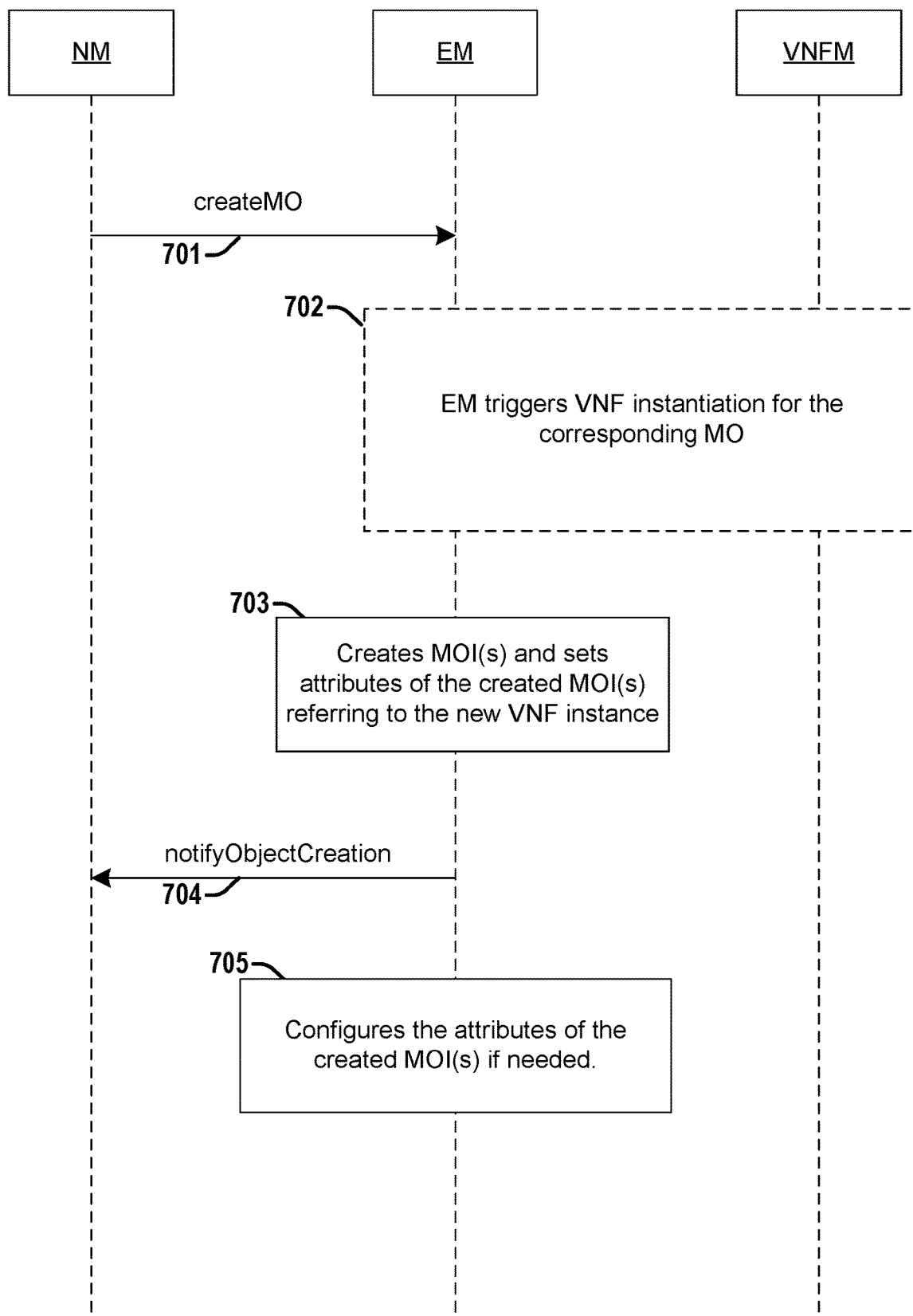
FIG. 7 is a diagram of a first procedure for MO creation triggering instantiation of a corresponding VNF, according to various aspects discussed herein.

Referring to FIG. 7, illustrated is a diagram showing a first procedure for MO creation triggering instantiation of a corresponding VNF, according to various aspects discussed herein.

At 701, the NM (e.g., which can comprise system 400, etc.) can send a request to create a MO (e.g., via a createMO operation) to the EM (e.g., via processor(s) 410 generating the request (e.g., createMO operation) and communication circuitry 420 sending the request to the EM via a Itf-N reference point). In aspects, the createMO can comprise (e.g., via processor(s) 410 generating the request to comprise) attributes and/or parameters such as an indicator for whether EM should trigger VNF instantiation and a VNFD (VNF Descriptor) Id (which can identify the VNFD which defines the VNF instance to be created), a flavourId (which can identify the VNF DF (Deployment Flavor) to be instantiated) in the attribute attributeListIn (a parameter which can identify the attributes to be returned by an operation) for EM to trigger corresponding VNF instantiation (in aspects, VNFD Id and flavourId can be new managed object class attributes held by attributeListIn in a conventional createMO operation or can be operation input parameters in a new version of createMO). Additional configuration parameters can also be included in the request (e.g., by processor(s) 410) as appropriate.

At 702, based on the information in the request, the EM (e.g., via processor(s) 510 of a system 500 employed by the EM) can trigger VNF instantiation for the corresponding MO. When the new VNF instance is allocated with virtualized resources (e.g., by processor(s) 610 of a system 600 employed by the VNFM) and configured with input parameters (e.g., by processor(s) 610) successfully, the VNFM can send (e.g., via communication circuitry 620 over the Ve-Vnfm-em reference point) a Notify operation (e.g., generated by processor(s) 610). The Notify operation (as generated by processor(s) 610) can carry an information element indicating the change in VNF lifecycle (e.g., a VnfLifecycleChangeNotification information element) to the EM (e.g., via the Ve-Vnfm-em reference point) that can comprise attributes such as vnfInstanceId (which can identify the VNF instance ID), status="result", operation="instantiation", lifecycleOperationOccurrenceId (lifecycle operation occurrence ID), affectedVnfc (which can indicate VNFC (VNF Component) instances affected during the lifecycle operation), affectedVl (which can indicate VL (Virtual Link) instances affected during the lifecycle operation), and affectedVirtualStorage (which can indicate virtualized storage instances affected during the lifecycle operation) to indicate the end and the successful result of VNF instantiation.

At 703, the EM (e.g., via processor(s) 510) can create the MOI(s) and (e.g., via processor(s) 510) can set attributes of the created MOI(s) (e.g., VNF Instance Id) referring to the new VNF instance.

At 704, the EM can send (e.g., via communication circuitry 520) a notification (e.g., notifyObjectCreation, etc.), which can be generated by processor(s) 510, to the NM (e.g., via the Itf-N reference point) to indicate the result of the MO creation to the NM.

At 705, the EM (e.g., via processor(s) 510) can configure the attributes of the created MOI(s) as appropriate and can send the NM (e.g., via communication circuitry 520 over the Itf-N reference point) notifications (e.g., attributeValueChange notifications, which can indicate attribute values that were changed), which processor(s) 510 can generate, if the NM has subscribed to such notification(s).

Figure 8:
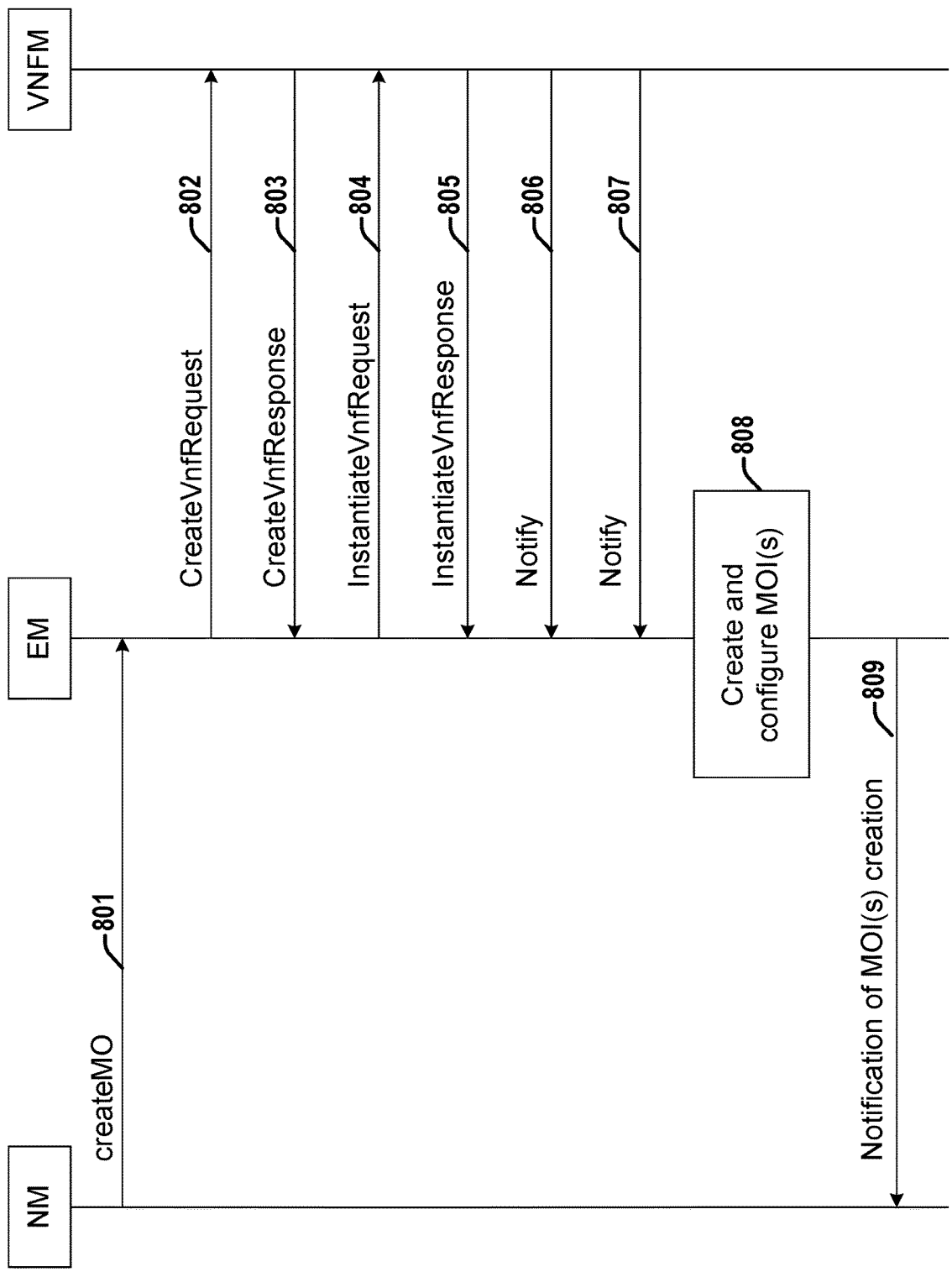
FIG. 8 is a diagram of a second procedure for MO creation triggering instantiation of a corresponding VNF, according to various aspects discussed herein.

Referring to FIG. 8, illustrated is a diagram showing a second procedure for MO creation triggering instantiation of a corresponding VNF, according to various aspects discussed herein. In this procedure, an NM can send a MOI(s) creation request with an attribute to ask the EM to instantiate a VNF. It can be assumed that the NM has on-boarded the VNF package, and the EM has subscribed to receive the VNF lifecycle change notification from VNFM.

At 801, the NM can initiate a createMO operation (e.g., which can be generated by processor(s) 410 and sent by communication circuitry 420) over the Itf-N reference point with an attribute to ask the EM to instantiate the VNF, along with potentially other information related to VNF instantiation, such as a vnfDescriptorId (a VNF descriptor ID, e.g., obtained from the VNF package), vnfInstanceName (a VNF instance name), and vnfInstanceDescription (a VNF instance description).

At 802, the EM can send (e.g., via communication circuitry 520) a request (e.g., generated by processor(s) 510) to create a VNF (e.g., a CreateVnf Request) to the VNFM (e.g., over the Ve-Vnfm-em reference point) which can comprise (e.g., be generated by processor(s) 510 to comprise) attributes indicated in the createMO operation (e.g., vnfDescriptorId, vnfInstanceName, and vnfInstanceDescription) to create the VNF identifier.

At 803, the VNFM can send (e.g., via communication circuitry 620) a response (e.g., generated by processor(s) 610) associated with VNF creation (e.g., CreateVnf Response) to the EM (e.g., via the Ve-Vnfm-em reference point) which can indicate an ID of the VNF instance (e.g., via vnfInstanceId) to indicate the creation of a new instance of a VNF information element.

At 804, the EM can send (e.g., via communication circuitry 520) a request (e.g., generated by processor(s) 510) to instantiate a VNF (e.g., an InstantiateVnfRequest) to the VNFM (e.g., via the Ve-Vnfm-em reference point) with input parameters (e.g., vnfInstanceId, flavourId, instantiationLevelId (which can identify the instantiation level of the DF to be instantiated), extVirtualLink (which can indicate information about the external VL (virtual link(s)) to connect the VNF to), extManagedVirtualLink (which can indicate information about internal VL(s) that are managed by other entities than the VNFM), flavourId, localizationLanguage (which can indicate the localization language of the VNF to be instantiated), and additionalParam (which can indicate additional parameter(s) passed by the EM as input to the instantiation process, specific to the VNF being instantiated)), to instantiate a VNF.

At 805, the VNFM can send (e.g., via communication circuitry 620) a response (e.g., generated by processor(s) 610) associated with instantiating the VNF (e.g., InstantiateVnf Response) with lifecycleOperationOccurrenceId (which can indicate the identifier of the VNF lifecycle operation occurrence) to the EM (e.g., via the Ve-Vnfm-em reference point).

At 806, the VNFM can send (e.g., via communication circuitry 620) a (first) Notify operation (e.g., generated by processor(s) 610) to the EM (e.g., via the Ve-Vnfm-em reference point), wherein a Notify operation can distribute notifications to subscribers from the VNFM to the EM or a VNF. The first Notify operation can carry an information element (e.g., VnfLifecycleChangeNotification) that can indicate changes in the VNF lifecycle to the EM with attributes vnfInstanceId (which can identify the VNF instance related to the information update), status="start", operation="instantiation", lifeycleOperationOccurrenceId, affectedVnfc, affectedVl, and affected VirtualStorage, to indicate the start of VNF instantiation.

At 807, the VNFM can send (e.g., via communication circuitry 620) a (second) Notify (e.g., generated by processor(s) 610) to the EM (e.g., via the Ve-Vnfm-em reference point) carrying an information element (e.g., VnfLifecycleChangeNotification) that can comprise attributes such as vnfInstanceId, status="result", operation="instantiation", lifeycleOperationOccurrenceId, affectedVnfc, affectedVl, and affected VirtualStorage to indicate the result of VNF instantiation, when the VNF instantiation operation is completed.

At 808, the EM can create (e.g., via processor(s) 510) the MOI(s) to represent the VNF instance. For example, if it is the MME (Mobility Management Entity) VNF, it (e.g., via processor(s) 510) can create an information object class MME Function (e.g., «IOC» MMEFunction), and can configure the attribute vnfInstanceId at an «IOC» ManagedFunction that can be the sub-class of «IOC» MMEFunction (in aspects, a new attribute can be added to «IOC» ManagedFunction to store the vnfInstanceId that was received from VNFM.

At 809, the EM can send (e.g., via communication circuitry 520) a notification (e.g., generated by processor(s) 510) of MOI(s) creation to the NM (e.g., via the Itf-N reference point).

VNF Instantiation to Trigger MOI(s) Creation

Figure 9:
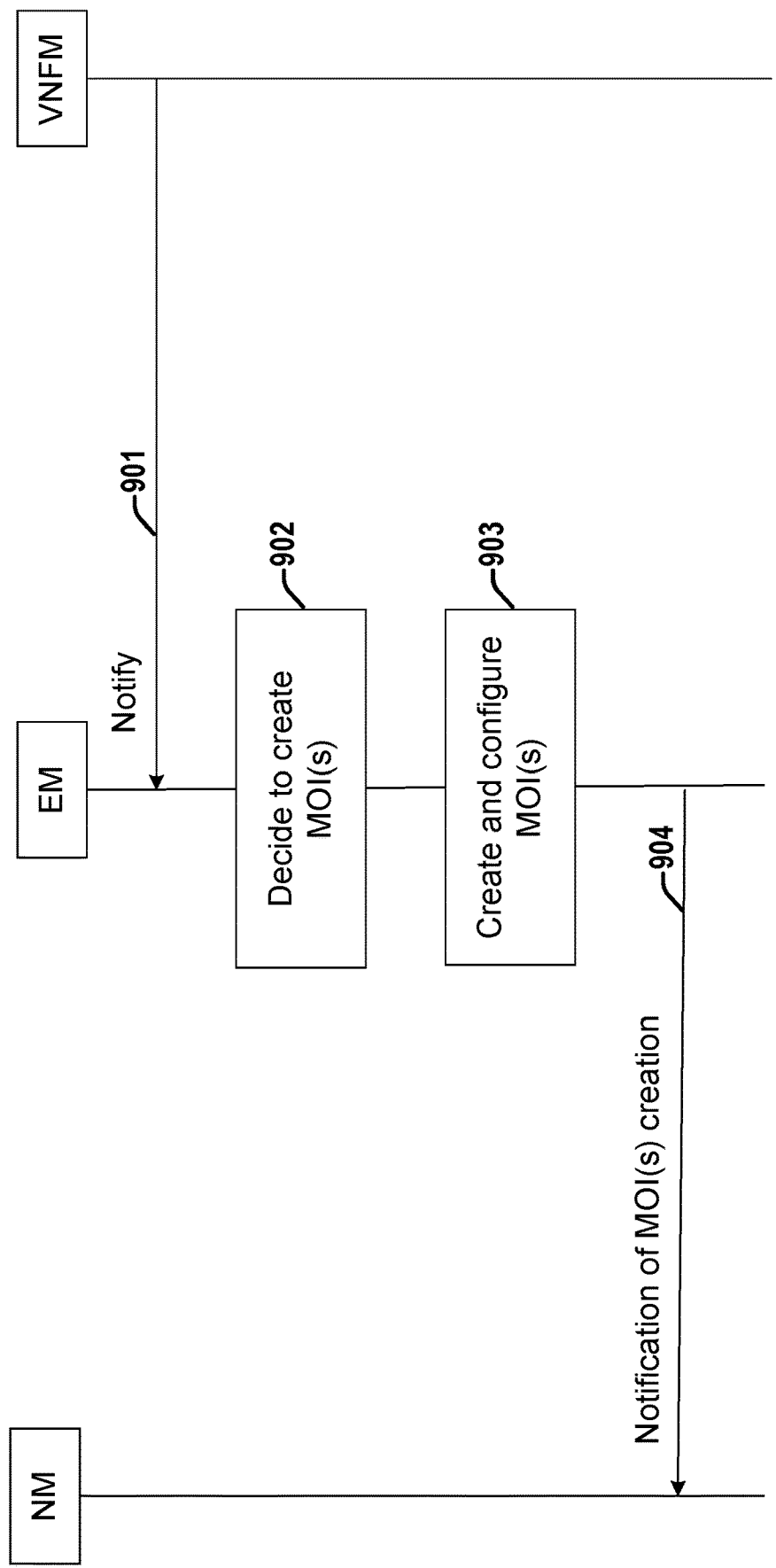
FIG. 9 is a diagram of a first procedure for VNF instantiation triggering creation of a corresponding MO, according to various aspects discussed herein.

Referring to FIG. 9, illustrated is a diagram showing a first procedure for VNF instantiation triggering creation of a corresponding MO, according to various aspects discussed herein. In various aspects, as shown in FIG. 9, when an EM receives the notification of VNF instantiation from a VNFM, the EM can trigger creation of one or more MOIs. In such aspects, it is assumed that the EM can have subscribed to receive the VNF lifecycle change notification(s) from the VNFM.

At 901, the VNFM can send (e.g., via communication circuitry 620) a Notify operation (e.g., generated by processor(s) 610) to the EM (e.g., via the Ve-Vnfm-em reference point). The Notify operation can comprise a VnfLifecycleChangeNotification information element which can comprise the attributes vnfInstanceId (VNF Instance ID), status="result", operation="instantiation", lifecycleOperationOccurrenceId (lifecycle operation occurrence ID), affectedVnfc (affected VNFC (VNF Component)), affectedVl (affected VL), and affectedVirtualStorage (affected Virtual Storage).

At 902, the EM (e.g., via processor(s) 510) can detect that a VNF instance has been instantiated after checking (e.g., via processor(s) 510) attributes status and operation, and (e.g., via processor(s) 510) can decide to create MOI(s) for such VNF instance.

At 903, the EM (e.g., via processor(s) 510) can create the MOI(s) to represent the VNF instance. For example, if it is the MME VNF, processor(s) 510 can create an «IOC» MMEFunction, and can configure the attribute vnfInstanceId at «IOC» ManagedFunction that can be the sub-class of «IOC» MMEFunction. In aspects, a new attribute can be added to the «IOC» ManagedFunction to store the vnfInstanceId that can be received by communication circuitry 520 from the VNFM over the Ve-Vnfm-em reference point and processed by processor(s) 510.

At 904, the EM can send (e.g., via communication circuitry 520) a notification (e.g., generated by processor(s) 510) of MOI(s) creation to the NM (e.g., via the Itf-N reference point).

MOI(s) Deletion and VNF Termination

As described below, the following procedures can relate MOI deletion and VNF termination: (1) MOI(s) deletion to trigger VNF termination or (2) VNF termination to trigger MOI(s) deletion.

MOI(s) Deletion Triggers VNF Termination

Figure 10:
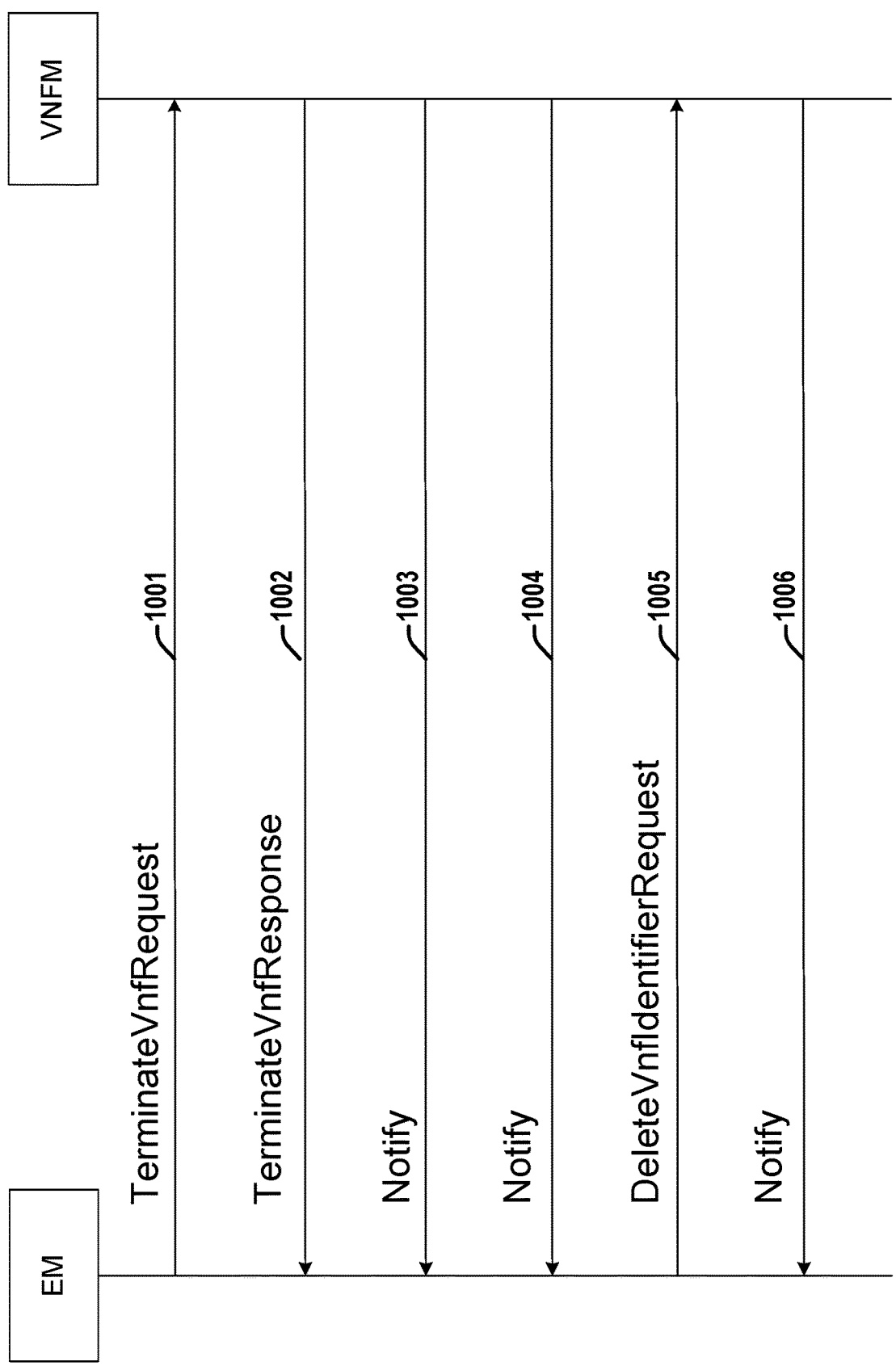
FIG. 10 is a diagram of a first procedure for MO deletion triggering termination of a corresponding VNF, according to various aspects discussed herein.

Referring to FIG. 10, illustrated is a diagram showing a first procedure for MO deletion triggering termination of a corresponding VNF, according to various aspects discussed herein. In this scenario, the EM has subscribed to receive the VNF lifecycle change notification from VNFM. The VNF instance identifier can be deleted after the VNF termination.

At 1001, the EM can send (e.g., via communication circuitry 520) a request (e.g., generated by processor(s) 510) to the VNFM (e.g., via reference point Ve-Vnfm-em) to terminate the VNF (e.g., TerminateVnfRequest). The request can identify the instance ID of the VNF to terminate (e.g., via vnfInstanceId) to facilitate termination of the VNF instance.

At 1002, the VNFM can send (e.g., via communication circuitry 620) a response (e.g., generated by processor(s) 610) to the EM (e.g., via the Ve-Vnfm-em reference point) indicating the VNF termination (e.g., TerminateVnf Response). In aspects, the response can comprise an occurrence ID of the termination/lifecycle operation (e.g., lifecycleOperationOccurrenceId).

At 1003, the VNFM can send (e.g., via communication circuitry 620) a (first) Notify operation (e.g., generated by processor(s) 610) to the EM (e.g., via the Ve-Vnfm-em reference point), wherein the first Notify operation can carry a notification (e.g., VnfLifecycleChangeNotification) of the VNF lifecycle change, to the EM with attributes vnfInstanceId (VNF instance ID), status="start", operation="termination" to indicate the start of VNF termination.

At 1004, the VNFM can send (e.g., via communication circuitry 620) a (second) Notify operation (e.g., generated by processor(s) 610) to the EM (e.g., via the Ve-Vnfm-em reference point). In aspects, the second Notify can comprise a notification of the VNF lifecycle change (e.g., VnfLifecycleChangeNotification) with attributes vnfInstanceId, affectedVnfc (affected VNFC), affected Virtual Link (affected VL), affectedVirtualStorage (affected virtual storage), status="result", operation="termination" to indicate the result of VNF termination, when the VNF termination operation is completed.

At 1005, the EM can send (e.g., via communication circuitry 520) a request (e.g., generated by processor(s) 510) to the VNFM (e.g., via the Ve-Vnfm-em reference point) to delete the VNF identifier (e.g., DeleteVnfIdentifierRequest) with vnfInstanceId to delete the VNF instance identifier.

At 1006, the VNFM can send (e.g., via communication circuitry 620) a (third) Notify operation (e.g., generated by processor(s) 610) to the EM (e.g., via the Ve-Vnfm-em reference point). In aspects, the third Notify can be a notification of deletion of the VNF identifier (e.g., a VnfIdentifierDeletionNotification information element) that can comprise the attribute vnfInstanceId indicating an instance ID of the deleted VNF.

Figure 11:
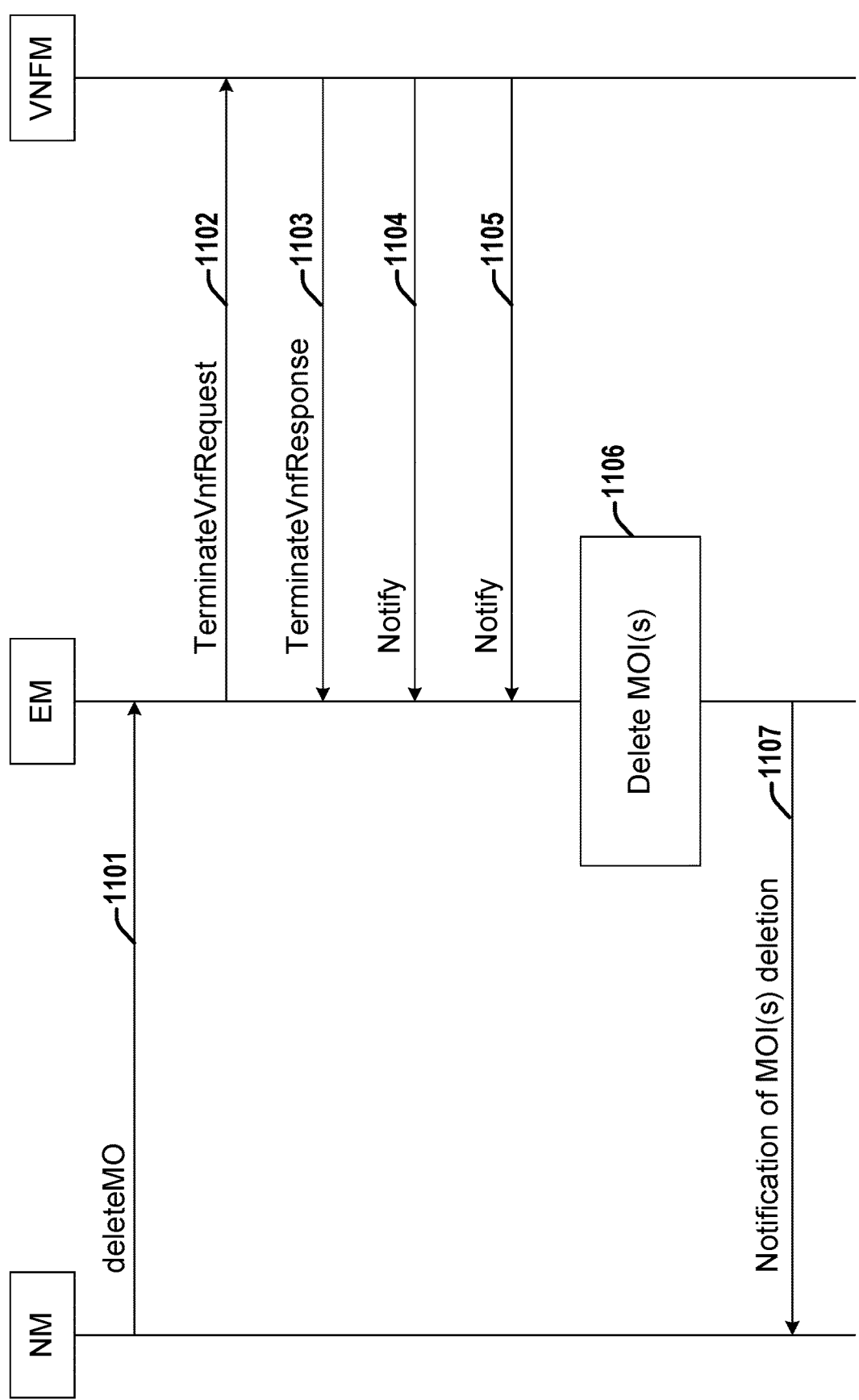
FIG. 11 is a diagram of a second procedure for MO deletion triggering termination of a corresponding VNF, according to various aspects discussed herein.

Referring to FIG. 11, illustrated is a diagram showing a second procedure for MO deletion triggering termination of a corresponding VNF, according to various aspects discussed herein. In this scenario, the NM can send a request to delete a MO (deleteMO request) with an attribute to ask the EM to terminate the VNF. The attribute can be provided along with the deleteMO request, or stored in the MO to be deleted. This scenario can be employed when a MO has been created to represent a VNF instance, and the EM has subscribed to receive the VNF lifecycle change notification from VNFM.

At 1101, the NM (e.g., via processor(s) 410) can initiate (e.g., generate) an operation to delete a MO (e.g., deleteMO operation) over the Itf-N reference point (e.g., output by communication circuitry 420) to the EM with an attribute to ask the EM to terminate the VNF.

At 1102, the EM can find the vnfInstanceId (VNF instance ID) from the MOI (e.g., processor(s) 510 can determine an associated VNF instance ID based on the MOI), and can send (e.g., via communication circuitry 520) a request to terminate the VNF (e.g., TerminateVnf Request) to the VNFM (e.g., via the Ve-Vnfm-em reference point) with a vnfInstanceId to terminate the VNF instance having the indicated VNF instance ID.

At 1103, the VNFM can send (e.g., via communication circuitry 620) a response (e.g., generated by processor(s) 610) associated with VNF termination (e.g., TerminateVnf Response) with lifecycleOperationOccurrenceId (e.g., identifying an occurrence ID of the lifecycle operation (the termination)) to the EM (e.g., via the Ve-Vnfm-em reference point).

At 1104, the VNFM can send (e.g., via communication circuitry 620) a (first) Notify operation (e.g., generated by processor(s) 610) to the EM (e.g., via the Ve-Vnfm-em reference point). The first Notify operation can carry a notification of the VNF lifecycle change (e.g., VnfLifecycleChangeNotification) with attributes vnfInstanceId (VNF Instance ID), status="start", operation="termination" to indicate the start of VNF termination.

At 1105, the VNFM can send (e.g., via communication circuitry 620) a (second) Notify operation (e.g., generated by processor(s) 610) to the EM (e.g., via the Ve-Vnfm-em reference point). The second Notify operation can carry a notification of the VNF lifecycle change (e.g., VnfLifecycleChangeNotification) with attributes vnfInstanceId, status="result", operation="termination" to indicate the result of VNF termination, when the VNF termination operation is completed.

At 1106, the EM (e.g., via processor(s) 510) can delete the MOI(s). For example, if the MOI is the MME VNF, processor(s) 510 can delete «IOC» MMEFunction, and its sub-class.

At 1107, the EM can send (e.g., via communication circuitry 520) a notification of MOI(s) deletion (e.g., generated by processor(s) 510) to NM (e.g., via the Itf-N reference point).

VNF Termination Triggers MOI(s) Deletion/Attribute Change

Figure 12:
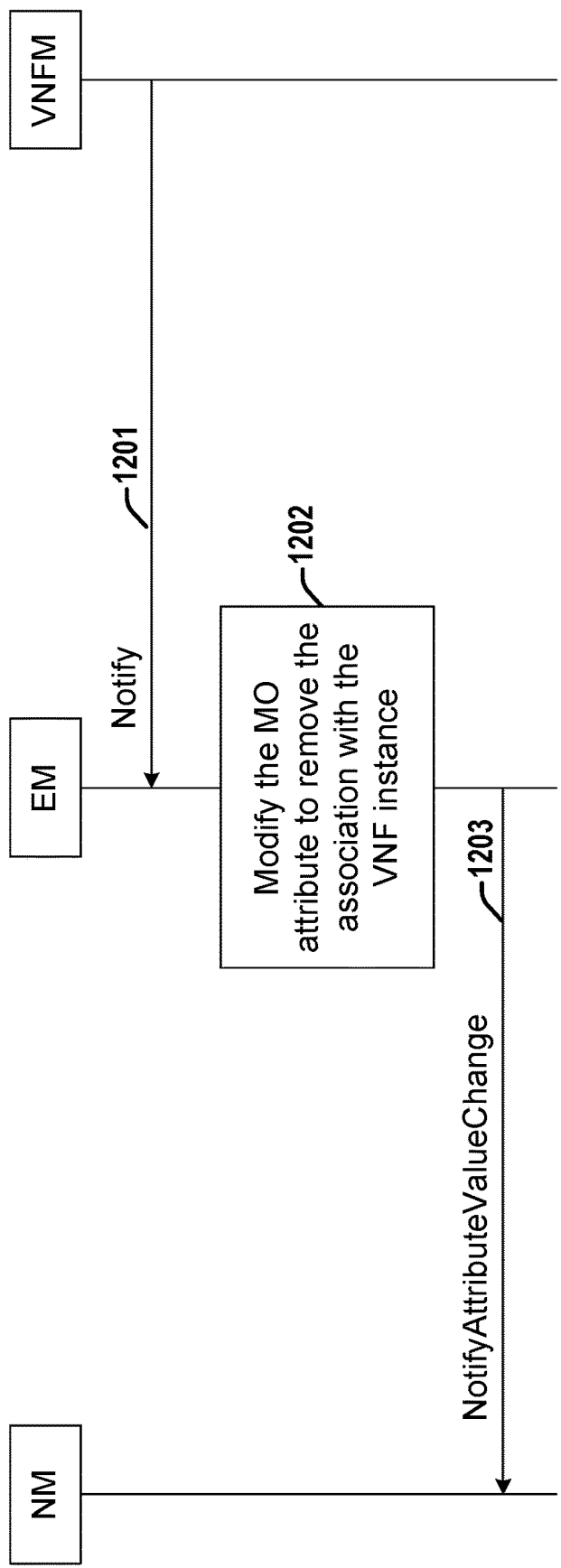
FIG. 12 is a diagram of a procedure for VNF termination triggering an attribute change of a corresponding MOI, according to various aspects discussed herein.

Referring to FIG. 12, illustrated is a diagram showing a procedure for VNF termination triggering an attribute change of a corresponding MOI, according to various aspects discussed herein. This procedure can involve actions employed by an EM when it receives a VNF lifecycle change notification indicating a VNF instance has been terminated. This scenario can involve an MO having been created to represent a VNF instance, and the EM having subscribed to receive the VNF lifecycle change notification from VNFM.

At 1201, the VNFM can send (e.g., via communication circuitry 620) a Notify operation (e.g., generated by processor(s) 610) to the EM (e.g., via the Ve-Vnfm-em reference point). The Notify operation can carry a notification of VNF lifecycle change (e.g., VnfLifecycleChangeNotification) to indicate the result of VNF termination, when the VNF termination operation is completed.

At 1202, the EM can detect (e.g., processor(s) 510 can detect) that a VNF instance has been terminated by checking the attributes status="result" and operation="termination", and can decide (e.g., processor(s) 510 can detect) to modify the MO attribute to remove the association with the VNF instance identified by an indicated VNF instance ID (vnfInstanceId).

At 1203, the EM can send (e.g., via communication circuitry 520) a notification (e.g., generated by processor(s) 510) of an attribute value change (e.g., via notifyAttributeValueChange) to the NM (e.g., via the Itf-N reference point) to indicate that the MO attribute value has been changed.

Figure 13:
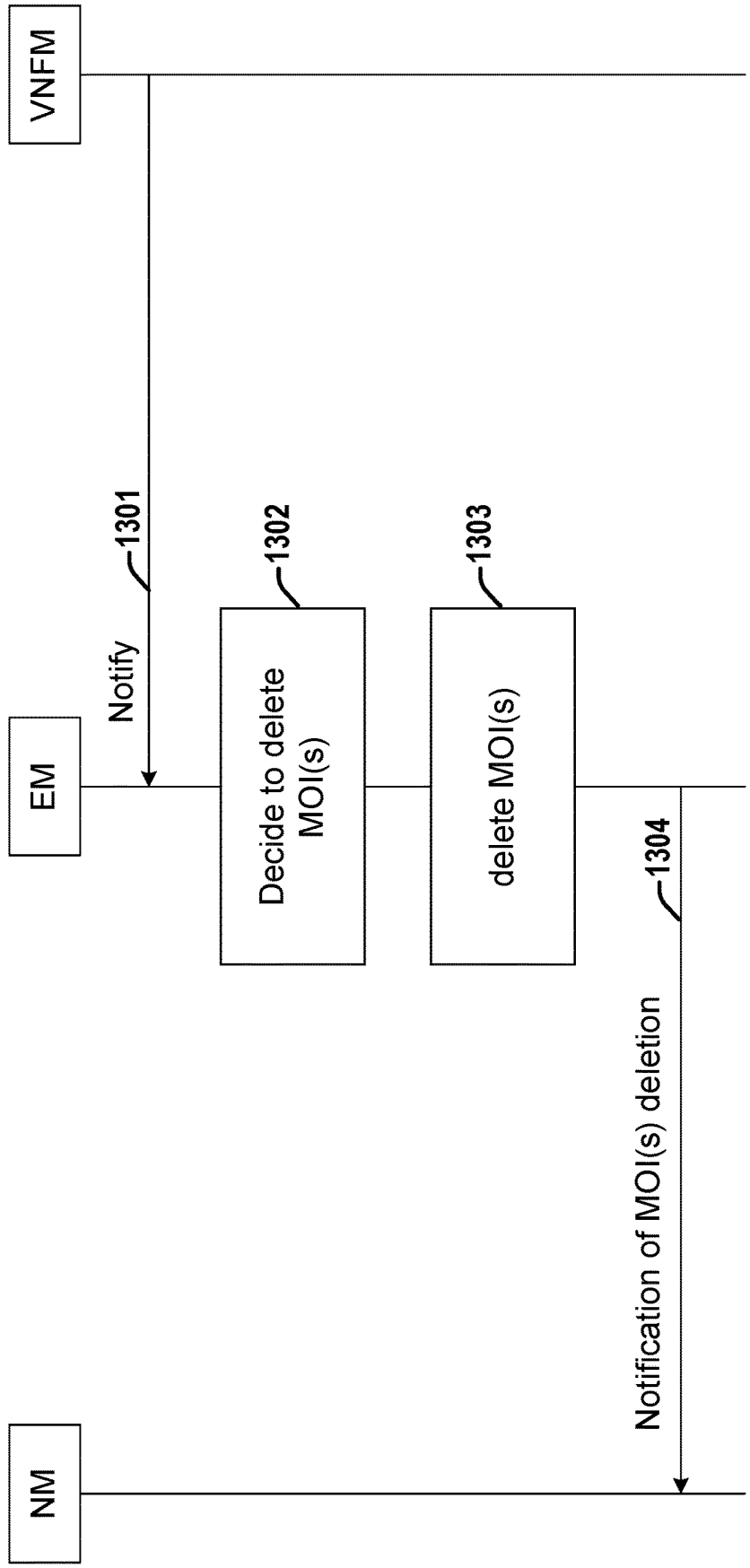
FIG. 13 is a diagram of a first procedure for VNF instantiation triggering creation of a corresponding MO, according to various aspects discussed herein.

Referring to FIG. 13, illustrated is a diagram showing a procedure for VNF termination triggering deletion of a corresponding MOI, according to various aspects discussed herein. This procedure can involve the EM receiving a VNF lifecycle change notification indicating that a VNF instance has been terminated, and the EM can decide to delete the MO, based on the attribute stored in the MO. This procedure can apply when a MO has been created to represent a VNF instance, and the EM has subscribed to receive the VNF lifecycle change notification from VNFM.

At 1301, the VNFM can send (e.g., via communication circuitry 620) a Notify operation (e.g., generated by processor(s) 610) to the EM (e.g., via the Ve-Vnfm-em reference point). In aspects, the Notify can indicate a notification of a VNF lifecycle change (e.g., VnfLifecycleChangeNotification), and can comprise attributes such as a VNF instance ID (vnfInstanceId) of the VNF, status="result", operation="termination" to indicate the result of VNF termination, when the VNF termination operation is completed.

At 1302, the EM can detect (e.g., processor(s) 510 can detect) that a VNF instance has been terminated by checking the attributes status and operation, and can decide (e.g., processor(s) 510 can determine) to delete the MOI(s) associated with such VNF instance.

At 1303, the EM can identify (e.g., processor(s) 510 can identify) the MO representing the VNF instance based on the indicated VNF instance ID and associated VNF instance IDs of MOI(s). For example, the EM (e.g., via processor(s) 510) can identify the MO by comparing the vnfInstanceId received (e.g., by communication circuitry 520 via the Ve-Vnfm-em reference point) from the VNFM against the vnfInstanceId stored in «IOC» ManagedFunction, and delete such MOI(s). For example, if the VNF is the MME VNF, the EM can delete «IOC» MMEFunction, and its sub-class.

At 1304, the EM can send (e.g., via communication circuitry 520) a notification of MOI(s) deletion (e.g., generated by processor(s) 510) to the NM (e.g., via the Itf-N reference point).

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within an EM (Element Manager), comprising: a memory; and one or more processors configured to: receive a first request to create a MO (Managed Object) from a NM (Network Manager), wherein the first request indicates triggering of an instantiation of a VNF (Virtual Network Function) and comprises a VNFD (VNF Descriptor) ID (identifier) of the VNF and a DF (Deployment Flavor) ID of the VNF; trigger the instantiation of the VNF based on the first request; receive a first Notify operation from a VNFM (VNF Manager) indicating a result of the instantiation of the VNF, wherein the first Notify operation comprises a notification of a change in a lifecycle of the VNF, an instance ID of the VNF, and one or more resources affected by the VNF; create a MOI (MO instance) comprising one or more attributes referring to the VNF, wherein the one or more attributes comprise the instance ID; and send a notification to the NM indicating that the MO has been created.

Example 2 comprises the subject matter of any variation of any of example(s) 1, wherein the one or more processors being configured to trigger instantiation of the VNF comprises the one or more processors being configured to: send a second request to the VNFM to create a VNF identifier associated with the VNF; receive a second response from the VNFM indicating the creation of a new instance of a VNF IE (information element) associated with the VNF; send a third request to the VNFM to instantiate the VNF; and receive a third response from the VNFM that identifies a lifecycle operation occurrence associated with the VNF.

Example 3 comprises the subject matter of any variation of any of example(s) 1, wherein the one or more processors are further configured to receive a second Notify operation from the VNFM indicating a start of the instantiation of the VNF.

Example 4 comprises the subject matter of any variation of any of example(s) 1, wherein the one or more processors are further configured to configure one or more attributes of the MOI.

Example 5 comprises the subject matter of any variation of any of example(s) 1, wherein the one or more resources affected by the VNF comprise one or more of at least one VNFC (VNF Component) instance, at least one VL (Virtual Link) instance, or at least one virtualized storage instance.

Example 6 comprises the subject matter of any variation of any of example(s) 1-5, wherein the one or more processors are further configured to: send a fourth request to the VNFM to terminate the VNF, wherein the fourth request indicates the instance ID of the VNF; receive a fourth response from the VNFM indicating a termination of the VNF, wherein the fourth response indicates a lifecycle operation occurrence ID of the termination; receive a third Notify operation from the VNFM, wherein the third Notify operation comprises a first notification of a lifecycle change of the VNF, the instance ID of the VNF, a status indicating a start of the lifecycle change, and an operation indicating the lifecycle change is the termination of the VNF; and receive a fourth Notify operation from the VNFM, wherein the fourth Notify operation comprises a second notification of the lifecycle change of the VNF, the one or more resources affected by the VNF, a status indicating a result of the lifecycle change, and an operation indicating the lifecycle change is the termination of the VNF.

Example 7 comprises the subject matter of any variation of any of example(s) 6, wherein the one or more processors are further configured to: send a fifth request to the VNFM to delete a VNF identifier that indicates the VNF instance ID; and receive a fifth Notify operation from the VNFM, wherein the fifth Notify operation comprises a notification of a deletion of the VNF identifier that indicates the VNF instance ID.

Example 8 comprises the subject matter of any variation of any of example(s) 6, wherein the one or more processors are further configured to: receive an operation from the NM to delete the MO, wherein the operation to delete the MO indicates the termination of the VNF; delete the MOI; and send a notification of the deletion of the MOI to the NM.

Example 9 comprises the subject matter of any variation of any of example(s) 1-5, wherein the one or more processors are further configured to: receive a sixth Notify operation from the VNFM, wherein the sixth Notify operation comprises a notification of a lifecycle change of the VNF, a status indicating a result of the lifecycle change, and an operation indicating the lifecycle change is the termination of the VNF; and detect that the VNF has been terminated based on checking the status and the operation of the sixth Notify operation.

Example 10 comprises the subject matter of any variation of any of example(s) 9, wherein the one or more processors are further configured to: determine to modify an attribute of the MOI to remove an association with the VNF instance ID; and send a notification to the NM that indicates that the attribute of the MOI has been changed.

Example 11 comprises the subject matter of any variation of any of example(s) 9, wherein the one or more processors are further configured to: determine to delete the MOI; identify the MOI based on the VNF instance ID; delete the MOI; and send a notification to the NM that indicates that the MOI has been deleted.

Example 12 comprises the subject matter of any variation of any of example(s) 1-2, wherein the one or more processors are further configured to receive a second Notify operation from the VNFM indicating a start of the instantiation of the VNF.

Example 13 comprises the subject matter of any variation of any of example(s) 1-2 or 12, wherein the one or more processors are further configured to configure one or more attributes of the MOI.

Example 14 comprises the subject matter of any variation of any of example(s) 5-6, wherein the one or more processors are further configured to: receive an operation from the NM to delete the MO, wherein the operation to delete the MO indicates the termination of the VNF; delete the MOI; and send a notification of the deletion of the MOI to the NM.

Example 15 is an apparatus configured to be employed within a VNFM (VNF (Virtual Network Function) Manager), comprising: a memory; and one or more processors configured to: allocate virtualized resources to an instance of a VNF; configure the instance of the VNF with one or more non-application parameters; and send a first Notify operation to an EM (Element Manager) indicating a result of the instantiation of the VNF, wherein the first Notify operation comprises a notification of a change in a lifecycle of the VNF, an instance ID of the VNF, and one or more resources affected by the VNF.

Example 16 comprises the subject matter of any variation of any of example(s) 15, wherein the one or more processors are further configured to: receive a first request from the EM to create a VNF identifier associated with the VNF; send a first response to the EM indicating the creation of a new instance of a VNF IE (information element) associated with the VNF; receive a second request from the EM to instantiate the VNF; and send a second response to the EM that identifies a lifecycle operation occurrence associated with the VNF.

Example 17 comprises the subject matter of any variation of any of example(s) 15, wherein the one or more processors are further configured to send a second Notify operation to the EM indicating a start of the instantiation of the VNF.

Example 18 comprises the subject matter of any variation of any of example(s) 15, wherein the one or more resources affected by the VNF comprise one or more of at least one VNFC (VNF Component) instance, at least one VL (Virtual Link) instance, or at least one virtualized storage instance.

Example 19 comprises the subject matter of any variation of any of example(s) 15-18, wherein the one or more processors are further configured to: receive a third request from the EM to terminate the VNF, wherein the third request indicates the instance ID of the VNF; send a third response to the EM indicating a termination of the VNF, wherein the third response indicates a lifecycle operation occurrence ID of the termination; send a third Notify operation to the EM, wherein the third Notify operation comprises a first notification of a lifecycle change of the VNF, the instance ID of the VNF, a status indicating a start of the lifecycle change, and an operation indicating the lifecycle change is the termination of the VNF; and send a fourth Notify operation to the EM, wherein the fourth Notify operation comprises a second notification of the lifecycle change of the VNF, the one or more resources affected by the VNF, a status indicating a result of the lifecycle change, and an operation indicating the lifecycle change is the termination of the VNF.

Example 20 comprises the subject matter of any variation of any of example(s) 19, wherein the one or more processors are further configured to: receive a fourth request from the EM to delete a VNF identifier that indicates the VNF instance ID; and send a fifth Notify operation to the EM, wherein the fifth Notify operation comprises a notification of a deletion of the VNF identifier that indicates the VNF instance ID.

Example 21 comprises the subject matter of any variation of any of example(s) 15-18, wherein the one or more processors are further configured to: send a sixth Notify operation to the EM, wherein the sixth Notify operation comprises a notification of a lifecycle change of the VNF, a status indicating a result of the lifecycle change, and an operation indicating the lifecycle change is the termination of the VNF.

Example 22 comprises the subject matter of any variation of any of example(s) 15-16, wherein the one or more processors are further configured to send a second Notify operation to the EM indicating a start of the instantiation of the VNF.

Example 23 is an apparatus configured to be employed within a NM (Network Manager), comprising: a memory; and one or more processors configured to: send a request to create a MO (Managed Object) to an EM (Element Manager), wherein the request indicates triggering of an instantiation of a VNF (Virtual Network Function) and comprises a VNFD (VNF Descriptor) ID (identifier) of the VNF and a DF (Deployment Flavor) ID of the VNF; and receive a notification of object creation from the EM, wherein the notification indicates a result of the request to create the MO.

Example 24 comprises the subject matter of any variation of any of example(s) 23, wherein the one or more processors are further configured to receive one or more additional notifications from the EM, wherein the one or more additional notifications indicate one or more attribute values of the MO that have been changed.

Example 25 comprises the subject matter of any variation of any of example(s) 24, wherein the one or more processors are further configured to subscribe to the one or more additional notifications.

Example 26 comprises the subject matter of any variation of any of example(s) 23-25, wherein the one or more processors are further configured to receive a second notification from the EM, wherein the second notification indicates a deletion of the MO.

Example 27 comprises the subject matter of any variation of any of example(s) 23-25, wherein the one or more processors are further configured to send an additional request to the EM, wherein the additional request comprises an operation to delete the MO, wherein the operation to delete the MO comprises an attribute indicating a termination of the VNF.

Example 28 is an apparatus configured to be employed within an EM (Element Manager), comprising: means for receiving a first request to create a MO (Managed Object) from a NM (Network Manager), wherein the first request indicates triggering of an instantiation of a VNF (Virtual Network Function) and comprises a VNFD (VNF Descriptor) ID (identifier) of the VNF and a DF (Deployment Flavor) ID of the VNF; means for triggering the instantiation of the VNF based on the first request; means for receiving a first Notify operation from a VNFM (VNF Manager) indicating a result of the instantiation of the VNF, wherein the first Notify operation comprises a notification of a change in a lifecycle of the VNF, an instance ID of the VNF, and one or more resources affected by the VNF; means for creating a MOI (MO instance) comprising one or more attributes referring to the VNF, wherein the one or more attributes comprise the instance ID; and means for sending a notification to the NM indicating that the MO has been created.

Example 29 comprises the subject matter of any variation of any of example(s) 28, further comprising: means for sending a second request to the VNFM to create a VNF identifier associated with the VNF; means for receiving a second response from the VNFM indicating the creation of a new instance of a VNF IE (information element) associated with the VNF; means for sending a third request to the VNFM to instantiate the VNF; and means for receiving a third response from the VNFM that identifies a lifecycle operation occurrence associated with the VNF.

Example 30 comprises the subject matter of any variation of any of example(s) 28, further comprising means for receiving a second Notify operation from the VNFM indicating a start of the instantiation of the VNF.

Example 31 comprises the subject matter of any variation of any of example(s) 28, further comprising means for configuring one or more attributes of the MOI.

Example 32 comprises the subject matter of any variation of any of example(s) 28, wherein the one or more resources affected by the VNF comprise one or more of at least one VNFC (VNF Component) instance, at least one VL (Virtual Link) instance, or at least one virtualized storage instance.

Example 33 comprises the subject matter of any variation of any of example(s) 28-32, further comprising: means for sending a fourth request to the VNFM to terminate the VNF, wherein the fourth request indicates the instance ID of the VNF; means for receiving a fourth response from the VNFM indicating a termination of the VNF, wherein the fourth response indicates a lifecycle operation occurrence ID of the termination; means for receiving a third Notify operation from the VNFM, wherein the third Notify operation comprises a first notification of a lifecycle change of the VNF, the instance ID of the VNF, a status indicating a start of the lifecycle change, and an operation indicating the lifecycle change is the termination of the VNF; and means for receiving a fourth Notify operation from the VNFM, wherein the fourth Notify operation comprises a second notification of the lifecycle change of the VNF, the one or more resources affected by the VNF, a status indicating a result of the lifecycle change, and an operation indicating the lifecycle change is the termination of the VNF.

Example 34 comprises the subject matter of any variation of any of example(s) 33, further comprising: means for sending a fifth request to the VNFM to delete a VNF identifier that indicates the VNF instance ID; and means for receiving a fifth Notify operation from the VNFM, wherein the fifth Notify operation comprises a notification of a deletion of the VNF identifier that indicates the VNF instance ID.

Example 35 comprises the subject matter of any variation of any of example(s) 33, further comprising: means for receiving an operation from the NM to delete the MO, wherein the operation to delete the MO indicates the termination of the VNF; means for deleting the MOI; and means for sending a notification of the deletion of the MOI to the NM.

Example 36 comprises the subject matter of any variation of any of example(s) 28-32, further comprising: means for receiving a sixth Notify operation from the VNFM, wherein the sixth Notify operation comprises a notification of a lifecycle change of the VNF, a status indicating a result of the lifecycle change, and an operation indicating the lifecycle change is the termination of the VNF; and means for detecting that the VNF has been terminated based on checking the status and the operation of the sixth Notify operation.

Example 37 comprises the subject matter of any variation of any of example(s) 36, further comprising: means for determining to modify an attribute of the MOI to remove an association with the VNF instance ID; and means for sending a notification to the NM that indicates that the attribute of the MOI has been changed.

Example 38 comprises the subject matter of any variation of any of example(s) 36, further comprising: means for determining to delete the MOI; means for identifying the MOI based on the VNF instance ID; means for deleting the MOI; and means for sending a notification to the NM that indicates that the MOI has been deleted.

Example 39 comprises the subject matter of any variation of any of example(s) 28-29, further comprising means for receiving a second Notify operation from the VNFM indicating a start of the instantiation of the VNF.

Example 40 comprises the subject matter of any variation of any of example(s) 28-29 or 39, further comprising means for configuring one or more attributes of the MOI.

Example 41 comprises the subject matter of any variation of any of example(s) 32-33, further comprising: means for receiving an operation from the NM to delete the MO, wherein the operation to delete the MO indicates the termination of the VNF; means for deleting the MOI; and means for sending a notification of the deletion of the MOI to the NM.

Example 42 is an apparatus configured to be employed within a VNFM (VNF (Virtual Network Function) Manager), comprising: means for allocating virtualized resources to an instance of a VNF; means for configuring the instance of the VNF with one or more non-application parameters; and means for sending a first Notify operation to an EM (Element Manager) indicating a result of the instantiation of the VNF, wherein the first Notify operation comprises a notification of a change in a lifecycle of the VNF, an instance ID of the VNF, and one or more resources affected by the VNF.

Example 43 comprises the subject matter of any variation of any of example(s) 42, further comprising: means for receiving a first request from the EM to create a VNF identifier associated with the VNF; means for sending a first response to the EM indicating the creation of a new instance of a VNF IE (information element) associated with the VNF; means for receiving a second request from the EM to instantiate the VNF; and means for sending a second response to the EM that identifies a lifecycle operation occurrence associated with the VNF.

Example 44 comprises the subject matter of any variation of any of example(s) 42, further comprising means for sending a second Notify operation to the EM indicating a start of the instantiation of the VNF.

Example 45 comprises the subject matter of any variation of any of example(s) 42, wherein the one or more resources affected by the VNF comprise one or more of at least one VNFC (VNF Component) instance, at least one VL (Virtual Link) instance, or at least one virtualized storage instance.

Example 46 comprises the subject matter of any variation of any of example(s) 42-45, further comprising: means for receiving a third request from the EM to terminate the VNF, wherein the third request indicates the instance ID of the VNF; means for sending a third response to the EM indicating a termination of the VNF, wherein the third response indicates a lifecycle operation occurrence ID of the termination; means for sending a third Notify operation to the EM, wherein the third Notify operation comprises a first notification of a lifecycle change of the VNF, the instance ID of the VNF, a status indicating a start of the lifecycle change, and an operation indicating the lifecycle change is the termination of the VNF; and means for sending a fourth Notify operation to the EM, wherein the fourth Notify operation comprises a second notification of the lifecycle change of the VNF, the one or more resources affected by the VNF, a status indicating a result of the lifecycle change, and an operation indicating the lifecycle change is the termination of the VNF.

Example 47 comprises the subject matter of any variation of any of example(s) 46, further comprising: means for receiving a fourth request from the EM to delete a VNF identifier that indicates the VNF instance ID; and means for sending a fifth Notify operation to the EM, wherein the fifth Notify operation comprises a notification of a deletion of the VNF identifier that indicates the VNF instance ID.

Example 48 comprises the subject matter of any variation of any of example(s) 42-45, further comprising: means for sending a sixth Notify operation to the EM, wherein the sixth Notify operation comprises a notification of a lifecycle change of the VNF, a status indicating a result of the lifecycle change, and an operation indicating the lifecycle change is the termination of the VNF.

Example 49 comprises the subject matter of any variation of any of example(s) 42-43, further comprising means for sending a second Notify operation to the EM indicating a start of the instantiation of the VNF.

Example 50 is an apparatus configured to be employed within a NM (Network Manager), comprising: means for sending a request to create a MO (Managed Object) to an EM (Element Manager), wherein the request indicates triggering of an instantiation of a VNF (Virtual Network Function) and comprises a VNFD (VNF Descriptor) ID (identifier) of the VNF and a DF (Deployment Flavor) ID of the VNF; and means for receiving a notification of object creation from the EM, wherein the notification indicates a result of the request to create the MO.

Example 51 comprises the subject matter of any variation of any of example(s) 50, further comprising means for receiving one or more additional notifications from the EM, wherein the one or more additional notifications indicate one or more attribute values of the MO that have been changed.

Example 52 comprises the subject matter of any variation of any of example(s) 51, further comprising means for subscribing to the one or more additional notifications.

Example 53 comprises the subject matter of any variation of any of example(s) 50-52, further comprising means for receiving a second notification from the EM, wherein the second notification indicates a deletion of the MO.

Example 54 comprises the subject matter of any variation of any of example(s) 50-52, further comprising means for sending an additional request to the EM, wherein the additional request comprises an operation to delete the MO, wherein the operation to delete the MO comprises an attribute indicating a termination of the VNF.

Example 55 is a machine readable medium comprising instructions that, when executed, cause an EM (Element Manager) to: receive a first request to create a MO (Managed Object) from a NM (Network Manager), wherein the first request indicates triggering of an instantiation of a VNF (Virtual Network Function) and comprises a VNFD (VNF Descriptor) ID (identifier) of the VNF and a DF (Deployment Flavor) ID of the VNF; trigger the instantiation of the VNF based on the first request; receive a first Notify operation from a VNFM (VNF Manager) indicating a result of the instantiation of the VNF, wherein the first Notify operation comprises a notification of a change in a lifecycle of the VNF, an instance ID of the VNF, and one or more resources affected by the VNF; create a MOI (MO instance) comprising one or more attributes referring to the VNF, wherein the one or more attributes comprise the instance ID; and send a notification to the NM indicating that the MO has been created.

Example 56 comprises the subject matter of any variation of any of example(s) 55, wherein the instructions, when executed, further cause the EM to: send a second request to the VNFM to create a VNF identifier associated with the VNF; receive a second response from the VNFM indicating the creation of a new instance of a VNF IE (information element) associated with the VNF; send a third request to the VNFM to instantiate the VNF; and receive a third response from the VNFM that identifies a lifecycle operation occurrence associated with the VNF.

Example 57 comprises the subject matter of any variation of any of example(s) 55, wherein the instructions, when executed, further cause the EM to receive a second Notify operation from the VNFM indicating a start of the instantiation of the VNF.

Example 58 comprises the subject matter of any variation of any of example(s) 55, wherein the instructions, when executed, further cause the EM to configure one or more attributes of the MOI.

Example 59 comprises the subject matter of any variation of any of example(s) 55, wherein the one or more resources affected by the VNF comprise one or more of at least one VNFC (VNF Component) instance, at least one VL (Virtual Link) instance, or at least one virtualized storage instance.

Example 60 comprises the subject matter of any variation of any of example(s) 55-59, wherein the instructions, when executed, further cause the EM to: send a fourth request to the VNFM to terminate the VNF, wherein the fourth request indicates the instance ID of the VNF; receive a fourth response from the VNFM indicating a termination of the VNF, wherein the fourth response indicates a lifecycle operation occurrence ID of the termination; receive a third Notify operation from the VNFM, wherein the third Notify operation comprises a first notification of a lifecycle change of the VNF, the instance ID of the VNF, a status indicating a start of the lifecycle change, and an operation indicating the lifecycle change is the termination of the VNF; and receive a fourth Notify operation from the VNFM, wherein the fourth Notify operation comprises a second notification of the lifecycle change of the VNF, the one or more resources affected by the VNF, a status indicating a result of the lifecycle change, and an operation indicating the lifecycle change is the termination of the VNF.

Example 61 comprises the subject matter of any variation of any of example(s) 60, wherein the instructions, when executed, further cause the EM to: send a fifth request to the VNFM to delete a VNF identifier that indicates the VNF instance ID; and receive a fifth Notify operation from the VNFM, wherein the fifth Notify operation comprises a notification of a deletion of the VNF identifier that indicates the VNF instance ID.

Example 62 comprises the subject matter of any variation of any of example(s) 60, wherein the instructions, when executed, further cause the EM to: receive an operation from the NM to delete the MO, wherein the operation to delete the MO indicates the termination of the VNF; delete the MOI; and send a notification of the deletion of the MOI to the NM.

Example 63 comprises the subject matter of any variation of any of example(s) 55-59, wherein the instructions, when executed, further cause the EM to: receive a sixth Notify operation from the VNFM, wherein the sixth Notify operation comprises a notification of a lifecycle change of the VNF, a status indicating a result of the lifecycle change, and an operation indicating the lifecycle change is the termination of the VNF; and detect that the VNF has been terminated based on checking the status and the operation of the sixth Notify operation.

Example 64 comprises the subject matter of any variation of any of example(s) 63, wherein the instructions, when executed, further cause the EM to: determine to modify an attribute of the MOI to remove an association with the VNF instance ID; and send a notification to the NM that indicates that the attribute of the MOI has been changed.

Example 65 comprises the subject matter of any variation of any of example(s) 63, wherein the instructions, when executed, further cause the EM to: determine to delete the MOI; identify the MOI based on the VNF instance ID; delete the MOI; and send a notification to the NM that indicates that the MOI has been deleted.

Example 66 comprises the subject matter of any variation of any of example(s) 55-56, wherein the instructions, when executed, further cause the EM to receive a second Notify operation from the VNFM indicating a start of the instantiation of the VNF.

Example 67 comprises the subject matter of any variation of any of example(s) 55-56 or 66, wherein the instructions, when executed, further cause the EM to configure one or more attributes of the MOI.

Example 68 comprises the subject matter of any variation of any of example(s) 59-60, wherein the instructions, when executed, further cause the EM to: receive an operation from the NM to delete the MO, wherein the operation to delete the MO indicates the termination of the VNF; delete the MOI; and send a notification of the deletion of the MOI to the NM.

Example 69 is a machine readable medium comprising instruction that, when executed, cause a VNFM (VNF (Virtual Network Function) Manager) to: allocate virtualized resources to an instance of a VNF; configure the instance of the VNF with one or more non-application parameters; and send a first Notify operation to an EM (Element Manager) indicating a result of the instantiation of the VNF, wherein the first Notify operation comprises a notification of a change in a lifecycle of the VNF, an instance ID of the VNF, and one or more resources affected by the VNF.

Example 70 comprises the subject matter of any variation of any of example(s) 69, wherein the instructions, when executed, further cause the EM to: receive a first request from the EM to create a VNF identifier associated with the VNF; send a first response to the EM indicating the creation of a new instance of a VNF IE (information element) associated with the VNF; receive a second request from the EM to instantiate the VNF; and send a second response to the EM that identifies a lifecycle operation occurrence associated with the VNF.

Example 71 comprises the subject matter of any variation of any of example(s) 69, wherein the instructions, when executed, further cause the EM to send a second Notify operation to the EM indicating a start of the instantiation of the VNF.

Example 72 comprises the subject matter of any variation of any of example(s) 69, wherein the one or more resources affected by the VNF comprise one or more of at least one VNFC (VNF Component) instance, at least one VL (Virtual Link) instance, or at least one virtualized storage instance.

Example 73 comprises the subject matter of any variation of any of example(s) 69-72, wherein the instructions, when executed, further cause the EM to: receive a third request from the EM to terminate the VNF, wherein the third request indicates the instance ID of the VNF; send a third response to the EM indicating a termination of the VNF, wherein the third response indicates a lifecycle operation occurrence ID of the termination; send a third Notify operation to the EM, wherein the third Notify operation comprises a first notification of a lifecycle change of the VNF, the instance ID of the VNF, a status indicating a start of the lifecycle change, and an operation indicating the lifecycle change is the termination of the VNF; and send a fourth Notify operation to the EM, wherein the fourth Notify operation comprises a second notification of the lifecycle change of the VNF, the one or more resources affected by the VNF, a status indicating a result of the lifecycle change, and an operation indicating the lifecycle change is the termination of the VNF.

Example 74 comprises the subject matter of any variation of any of example(s) 73, wherein the instructions, when executed, further cause the EM to: receive a fourth request from the EM to delete a VNF identifier that indicates the VNF instance ID; and send a fifth Notify operation to the EM, wherein the fifth Notify operation comprises a notification of a deletion of the VNF identifier that indicates the VNF instance ID.

Example 75 comprises the subject matter of any variation of any of example(s) 69-72, wherein the instructions, when executed, further cause the EM to: send a sixth Notify operation to the EM, wherein the sixth Notify operation comprises a notification of a lifecycle change of the VNF, a status indicating a result of the lifecycle change, and an operation indicating the lifecycle change is the termination of the VNF.

Example 76 comprises the subject matter of any variation of any of example(s) 69-70, wherein the instructions, when executed, further cause the EM to send a second Notify operation to the EM indicating a start of the instantiation of the VNF.

Example 77 is a machine readable medium comprising instructions that, when executed, cause a NM (Network Manager) to: send a request to create a MO (Managed Object) to an EM (Element Manager), wherein the request indicates triggering of an instantiation of a VNF (Virtual Network Function) and comprises a VNFD (VNF Descriptor) ID (identifier) of the VNF and a DF (Deployment Flavor) ID of the VNF; and receive a notification of object creation from the EM, wherein the notification indicates a result of the request to create the MO.

Example 78 comprises the subject matter of any variation of any of example(s) 77, wherein the instructions, when executed, further cause the EM to receive one or more additional notifications from the EM, wherein the one or more additional notifications indicate one or more attribute values of the MO that have been changed.

Example 79 comprises the subject matter of any variation of any of example(s) 78, wherein the instructions, when executed, further cause the EM to subscribe to the one or more additional notifications.

Example 80 comprises the subject matter of any variation of any of example(s) 77-79, wherein the instructions, when executed, further cause the EM to receive a second notification from the EM, wherein the second notification indicates a deletion of the MO.

Example 81 comprises the subject matter of any variation of any of example(s) 77-79, wherein the instructions, when executed, further cause the EM to send an additional request to the EM, wherein the additional request comprises an operation to delete the MO, wherein the operation to delete the MO comprises an attribute indicating a termination of the VNF.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within an EM (Element Manager), comprising:
    a memory; and
    one or more processors configured to:
        receive a first request to create a MO (Managed Object) from a NM (Network Manager), wherein the first request indicates triggering of an instantiation of a VNF (Virtual Network Function) and comprises a VNFD (VNF Descriptor) ID (identifier) of the VNF and a DF (Deployment Flavor) ID of the VNF;
        trigger the instantiation of the VNF based on the first request;
        receive a first Notify operation from a VNFM (VNF Manager) indicating a result of the instantiation of the VNF, wherein the first Notify operation comprises a notification of a change in a lifecycle of the VNF, an instance ID of the VNF, and one or more resources affected by the VNF;
        create a MOI (MO instance) comprising one or more attributes referring to the VNF, wherein the one or more attributes comprise the instance ID; and
        send a notification to the NM indicating that the MO has been created.

2. The apparatus of claim 1, wherein the one or more processors being configured to trigger instantiation of the VNF comprises the one or more processors being configured to:
    send a second request to the VNFM to create a VNF identifier associated with the VNF;
    receive a second response from the VNFM indicating the creation of a new instance of a VNF IE (information element) associated with the VNF;
    send a third request to the VNFM to instantiate the VNF; and
    receive a third response from the VNFM that identifies a lifecycle operation occurrence associated with the VNF.

3. The apparatus of claim 1, wherein the one or more processors are further configured to receive a second Notify operation from the VNFM indicating a start of the instantiation of the VNF.

4. The apparatus of claim 1, wherein the one or more processors are further configured to configure one or more attributes of the MOI.

5. The apparatus of claim 1, wherein the one or more resources affected by the VNF comprise one or more of at least one VNFC (VNF Component) instance, at least one VL (Virtual Link) instance, or at least one virtualized storage instance.

6. The apparatus of claim 1, wherein the one or more processors are further configured to:
    send a fourth request to the VNFM to terminate the VNF, wherein the fourth request indicates the instance ID of the VNF;
    receive a fourth response from the VNFM indicating a termination of the VNF, wherein the fourth response indicates a lifecycle operation occurrence ID of the termination;
    receive a third Notify operation from the VNFM, wherein the third Notify operation comprises a first notification of a lifecycle change of the VNF, the instance ID of the VNF, a status indicating a start of the lifecycle change, and an operation indicating the lifecycle change is the termination of the VNF; and
    receive a fourth Notify operation from the VNFM, wherein the fourth Notify operation comprises a second notification of the lifecycle change of the VNF, the one or more resources affected by the VNF, a status indicating a result of the lifecycle change, and an operation indicating the lifecycle change is the termination of the VNF.

7. The apparatus of claim 6, wherein the one or more processors are further configured to:
    send a fifth request to the VNFM to delete a VNF identifier that indicates the VNF instance ID; and
    receive a fifth Notify operation from the VNFM, wherein the fifth Notify operation comprises a notification of a deletion of the VNF identifier that indicates the VNF instance ID.

8. The apparatus of claim 6, wherein the one or more processors are further configured to:
    receive an operation from the NM to delete the MO, wherein the operation to delete the MO indicates the termination of the VNF;
    delete the MOI; and
    send a notification of the deletion of the MOI to the NM.

9. The apparatus of claim 1, wherein the one or more processors are further configured to:

receive a sixth Notify operation from the VNFM, wherein the sixth Notify operation comprises a notification of a lifecycle change of the VNF, a status indicating a result of the lifecycle change, and an operation indicating the lifecycle change is the termination of the VNF; and detect that the VNF has been terminated based on checking the status and the operation of the sixth Notify operation.

10. The apparatus of claim 9, wherein the one or more processors are further configured to:
   determine to modify an attribute of the MOI to remove an association with the VNF instance ID; and
   send a notification to the NM that indicates that the attribute of the MOI has been changed.

11. The apparatus of claim 9, wherein the one or more processors are further configured to:
   determine to delete the MOI;
   identify the MOI based on the VNF instance ID;
   delete the MOI; and
   send a notification to the NM that indicates that the MOI has been deleted.

12. An apparatus configured to be employed within a VNFM (VNF (Virtual Network Function) Manager), comprising:
   a memory; and
   one or more processors configured to:
      allocate virtualized resources to an instance of a VNF;
      configure the instance of the VNF with one or more input parameters; and
      send a first Notify operation to an EM (Element Manager) indicating a result of the instantiation of the VNF, wherein the first Notify operation comprises a notification of a change in a lifecycle of the VNF, an instance ID of the VNF, and one or more resources affected by the VNF.

13. The apparatus of claim 12, wherein the one or more processors are further configured to:
   receive a first request from the EM to create a VNF identifier associated with the VNF;
   send a first response to the EM indicating the creation of a new instance of a VNF IE (information element) associated with the VNF;
   receive a second request from the EM to instantiate the VNF; and
   send a second response to the EM that identifies a lifecycle operation occurrence associated with the VNF.

14. The apparatus of claim 12, wherein the one or more processors are further configured to send a second Notify operation to the EM indicating a start of the instantiation of the VNF.

15. The apparatus of claim 12, wherein the one or more resources affected by the VNF comprise one or more of at least one VNFC (VNF Component) instance, at least one VL (Virtual Link) instance, or at least one virtualized storage instance.

16. The apparatus of claim 12, wherein the one or more processors are further configured to:
   receive a third request from the EM to terminate the VNF, wherein the third request indicates the instance ID of the VNF;
   send a third response to the EM indicating a termination of the VNF, wherein the third response indicates a lifecycle operation occurrence ID of the termination;
   send a third Notify operation to the EM, wherein the third Notify operation comprises a first notification of a lifecycle change of the VNF, the instance ID of the VNF, a status indicating a start of the lifecycle change, and an operation indicating the lifecycle change is the termination of the VNF; and
   send a fourth Notify operation to the EM, wherein the fourth Notify operation comprises a second notification of the lifecycle change of the VNF, the one or more resources affected by the VNF, a status indicating a result of the lifecycle change, and an operation indicating the lifecycle change is the termination of the VNF.

17. The apparatus of claim 16, wherein the one or more processors are further configured to:
   receive a fourth request from the EM to delete a VNF identifier that indicates the VNF instance ID; and
   send a fifth Notify operation to the EM, wherein the fifth Notify operation comprises a notification of a deletion of the VNF identifier that indicates the VNF instance ID.

18. The apparatus of claim 12, wherein the one or more processors are further configured to:
   send a sixth Notify operation to the EM, wherein the sixth Notify operation comprises a notification of a lifecycle change of the VNF, a status indicating a result of the lifecycle change, and an operation indicating the lifecycle change is the termination of the VNF.

* * * * *